(12) United States Patent
Nago et al.

(10) Patent No.: US 8,997,943 B2
(45) Date of Patent: Apr. 7, 2015

(54) BICYCLE BRAKE WITH SYNCHRONIZED BRAKE ARMS

(75) Inventors: Daisuke Nago, Sakai (JP); Osamu Kariyama, Sakai (JP); Tatsuya Matsushita, Sakai (JP); Masahiro Nakakura, Sakai (JP); Takefumi Terada, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 161 days.

(21) Appl. No.: 13/408,324

(22) Filed: Feb. 29, 2012

(65) Prior Publication Data

US 2012/0222921 A1  Sep. 6, 2012

Related U.S. Application Data

(63) Continuation-in-part of application No. 13/040,930, filed on Mar. 4, 2011, now Pat. No. 8,336,680.

(30) Foreign Application Priority Data

Oct. 17, 2011 (JP) .................................. 2011-228355

(51) Int. Cl.
  B62L 1/16 (2006.01)
(52) U.S. Cl.
  CPC ........................................ *B62L 1/16* (2013.01)
(58) Field of Classification Search
  CPC ............... B62L 1/06; B62L 1/08; B62L 1/14; B62L 1/16
  USPC .......... 188/24.11, 24.12, 24.13, 24.19, 24.22, 188/24.14, 24.15
  See application file for complete search history.

(56) References Cited

U.S. PATENT DOCUMENTS

| | | | |
|---|---|---|---|
| 3,314,504 A | | 4/1967 | Altenburger |
| 3,338,337 A | | 8/1967 | Freeland et al. |
| 3,899,056 A | | 8/1975 | Doerr |
| 3,899,057 A | | 8/1975 | Carre |
| 4,263,990 A | * | 4/1981 | Yoshigai ..................... 188/24.19 |
| 4,290,507 A | * | 9/1981 | Brown ........................ 188/24.15 |

(Continued)

FOREIGN PATENT DOCUMENTS

| | | |
|---|---|---|
| BE | 462250 | 1/1946 |
| CN | 201169355 Y | 12/2008 |

(Continued)

OTHER PUBLICATIONS

European Search Report for EP 12157475, the European application that corresponds to this application, dated Jun. 19, 2012.

(Continued)

*Primary Examiner* — Thomas J Williams
(74) *Attorney, Agent, or Firm* — James A. Deland

(57) ABSTRACT

A bicycle brake apparatus includes first and second brake arms. The first brake arm includes a first brake arm mounting portion for mounting the first brake arm to a bicycle frame member, a first brake pad mounting portion, and a first control interface portion. The second brake arm includes a second brake arm mounting portion for mounting the second brake arm to the bicycle frame member and a second brake pad mounting portion. A synchronizing link communicates a synchronizing force that arises from one of the first brake arm or the second brake arm to the other one of the first brake arm or the second brake arm so that the first brake arm and the second brake arm move in synchronization.

20 Claims, 18 Drawing Sheets

(56) References Cited

U.S. PATENT DOCUMENTS

| | | | |
|---|---|---|---|
| 4,852,698 A * | 8/1989 | Nagano | 188/24.19 |
| 5,188,200 A | 2/1993 | Modolo | |
| 5,425,434 A | 6/1995 | Romano | |
| 5,894,913 A * | 4/1999 | Sugimoto | 188/24.11 |
| 6,155,383 A | 12/2000 | Sugimoto | |
| 7,000,739 B2 * | 2/2006 | Ciamillo | 188/24.22 |
| 7,182,180 B2 * | 2/2007 | Tsai | 188/24.12 |
| 7,975,810 B2 * | 7/2011 | Liu et al. | 188/24.22 |
| 8,869,949 B2 * | 10/2014 | Jordan et al. | 188/24.22 |
| 2005/0258582 A1 * | 11/2005 | Chou | 267/177 |
| 2006/0113151 A1 | 6/2006 | Tsai | |
| 2009/0038894 A1 | 2/2009 | Liu et al. | |

FOREIGN PATENT DOCUMENTS

| | | |
|---|---|---|
| CN | 201189931 Y | 2/2009 |
| DE | 2139770 A1 | 2/1973 |
| DE | 2800364 A1 | 7/1979 |
| DE | 8716344.6 U1 | 1/1988 |
| DE | 3805237 A1 | 11/1988 |
| DE | 3805327 A1 | 11/1988 |
| DE | 3825394 A1 | 4/1989 |
| DE | 20319913 U1 | 10/2004 |
| DE | 20319913 U1 | 11/2004 |
| EP | 260819 A1 | 8/1987 |
| EP | 347559 A1 | 4/1989 |
| EP | 0575720 A1 | 12/1993 |
| EP | 2444310 A1 | 4/2012 |
| FR | 358535 | 2/1906 |
| FR | 391790 | 11/1908 |
| FR | 497505 | 12/1919 |
| FR | 868090 | 12/1941 |
| FR | 907896 | 3/1946 |
| GB | 607403 | 8/1948 |
| GB | 1093809 | 12/1967 |
| GB | 2145484 A | 3/1985 |
| JP | 55-42666 | 3/1980 |
| JP | 56-75083 | 6/1981 |
| JP | 62-177592 U | 11/1987 |
| JP | 63-112995 U | 7/1988 |
| JP | 64-90890 A | 4/1989 |
| JP | 64-90891 A | 4/1989 |
| JP | 01275294 A * | 11/1989 |
| JP | 1-172995 U | 12/1989 |
| JP | 09-267787 A | 10/1997 |
| JP | 2011-102063 A | 5/2011 |
| TW | I-270500 | 1/2007 |
| TW | M-360201 U1 | 7/2009 |

OTHER PUBLICATIONS

Extended European Search Report for EP 12157477.6, the European application that corresponds to this application, dated Feb. 6, 2014.
Partial European Search Report for EP 12157477.6, the European application that corresponds to this application, dated Oct. 18, 2013.

* cited by examiner

BICYCLE BRAKE WITH SYNCHRONIZED BRAKE ARMS

CROSS REFERENCE TO RELATED APPLICATIONS

This application is a continuation-in-part of U.S. patent application Ser. No. 13/040,930 filed Mar. 4, 2011 and titled "Center-Pull Bicycle Brake With Synchronized Brake Arms."

BACKGROUND OF THE INVENTION

The present invention is directed to bicycle brakes and, more particularly, to a bicycle brake with synchronized brake arms.

Bicycle brakes include center-pull brakes and side-pull brakes. Conventional center-pull bicycle brakes comprise first and second brake arms pivotably mounted to a bicycle frame member such as a front fork or a rear seat stay of the bicycle frame. Each brake arm includes a brake arm mounting portion for mounting the brake arm to the bicycle frame member, a brake pad mounting portion, and a control interface portion. The brake arm mounting portion is disposed between the brake pad mounting portion and the control interface portion such that the brake pad mounting portion is disposed below the brake arm mounting portion when the brake arm is mounted to the bicycle frame member. When the first and second brake arms are mounted to the bicycle frame member, the control interface portion of the first brake arm extends to the side of the bicycle frame member at which the second brake arm is mounted, and vice versa. First and second return springs usually are mounted between the respective first and second brake arm mounting portions and the bicycle frame member for biasing the first and second brake pad mounting portions away from the bicycle wheel rim.

After the first and second brake arms are mounted to the bicycle frame member, an intermediate control element such as a control wire is mounted to the first control interface portion of the first brake arm and to the second control interface portion of the second brake arm. A primary control element then is mounted to the center of the intermediate control element such that, when the primary control element is pulled upwardly, the first and second brake arms rotate against the biasing forces of the first and second return springs so that first and second brake pads mounted to the first and second brake pad mounting portions frictionally contact the bicycle wheel rim.

Conventional side-pull bicycle brakes also comprise first and second brake arms pivotably mounted to a bicycle frame member such as a front fork or a rear seat stay of the bicycle frame. Each brake arm includes a brake arm mounting portion for mounting the brake arm to the bicycle frame member, a brake pad mounting portion, and a control interface portion. The brake arm mounting portion is disposed between the brake pad mounting portion and the control interface portion. When the first and second brake arms are mounted to the bicycle frame member, the control interface portions of the first and second brake arms are located on the same side of the bicycle wheel. A return spring usually is mounted between the first and second brake arms for biasing the first and second brake pad mounting portions away from the bicycle wheel rim.

After the first and second brake arms are mounted to the bicycle frame member, an inner wire of a Bowden cable is coupled to the control interface portion of the first brake arm, and an outer casing of the Bowden cable is attached to the control interface portion of the second brake arm. When the inner wire of the Bowden cable is pulled by a brake lever mounted to the bicycle handlebar, the distance between the control interface portions of the first and second brake arms is reduced, thereby causing the brake pad mounting portions of the first and second brake arms to move towards and frictionally the wheel rim.

In both center-pull bicycle brakes and side-pull bicycle brakes, the friction caused by the structures used to mount the first and second brake arm mounting portions to the bicycle frame member sometimes is not equally balanced between the first and second brake arms. As a result, the rotation of the first and second brake arms is not properly synchronized, so the first and second brake pads do not contact the wheel rim at the same time. Several attempts have been made to solve this synchronization problem. For example, JP 62-177592 discloses a center-pull bicycle brake wherein first and second gear wheels engage gear teeth formed on the first and second brake arms to synchronously push the control interface portions of the first and second brake arms apart during operation of the brake. JP 63-112995 discloses a center-pull bicycle brake wherein first and second rollers are respectively mounted to the first and second control interface portions of the first and second brake arms. A cam mounted to the primary control element contacts the first and second rollers to synchronously push the first and second control interface portions of the first and second brake arms apart when the primary control element is pulled upwardly. JP 64-90890 discloses a center-pull bicycle brake wherein a pair of links with attached rollers are pushed apart by a cam mounted to the primary control element. The rollers synchronously push the first and second control interface portions of the first and second brake arms apart when the primary control element is pulled upwardly JP 64-90891 discloses a center-pull bicycle brake wherein multiple links are connected both in series and in parallel to the first and second brake arms and to the primary control element to synchronously push the first and second control interface portions of the first and second brake arms apart when the primary control element is pulled upwardly. However, the complicated structures disclosed in those references add more friction and operating effort to the brake device, and the friction and operating effort only gets worse when the synchronizing assemblies are subjected to water, dirt, mud and other contaminants.

Another disadvantage of prior art braking systems is that the biasing forces of the return springs must be overcome by the rider in order to operate the brakes. When synchronizing structures are used to synchronize the operation of the first and second brake arms, stronger return springs must be used to generate the greater biasing forces needed to overcome the additional friction created by the synchronizing structures and to rotate the first and second brake arms so that the first and second brake pads are separated from the wheel rim. Such additional biasing forces further increase the effort required by the rider to operate the brakes.

SUMMARY OF THE INVENTION

The present invention is directed to various features of a bicycle brake device. In one embodiment, a bicycle brake apparatus includes first and second brake arms. The first brake arm includes a first brake arm mounting portion for mounting the first brake arm to a bicycle frame member, a first brake pad mounting portion, and a first control interface portion. The second brake arm includes a second brake arm mounting portion for mounting the second brake arm to the bicycle frame member and a second brake pad mounting portion. A synchronizing link communicates a synchronizing force that arises from one of the first brake arm or the second brake arm to the other one of the first brake arm or the second brake arm so that the first brake arm and the second brake arm move in synchronization. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
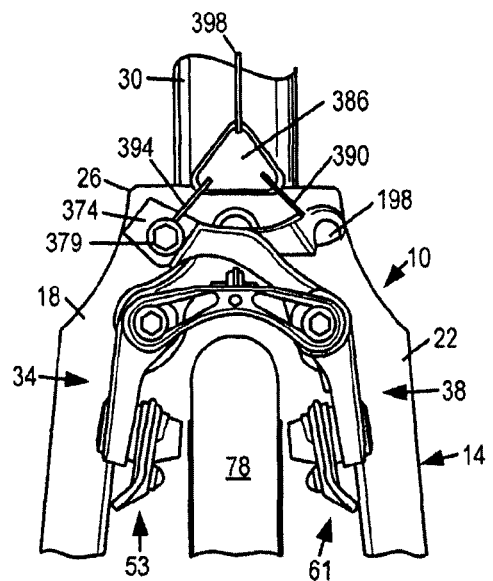
FIG. 1 is a front view of an embodiment of a center-pull bicycle brake device attached to a front fork of a bicycle.
Figure 2:
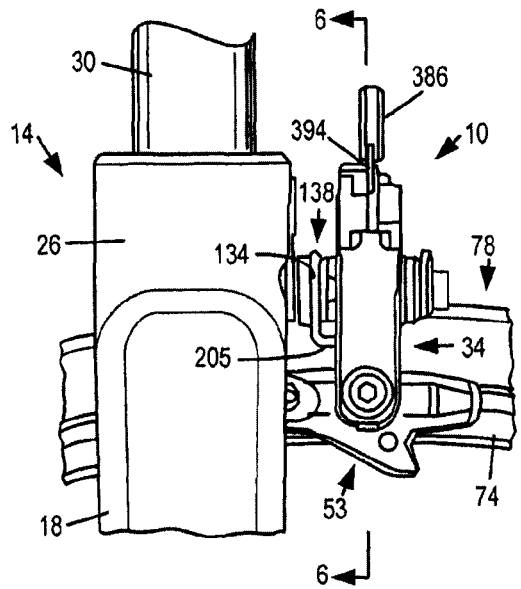
FIG. 2 is a right side view of the center-pull bicycle brake device.
Figure 3:
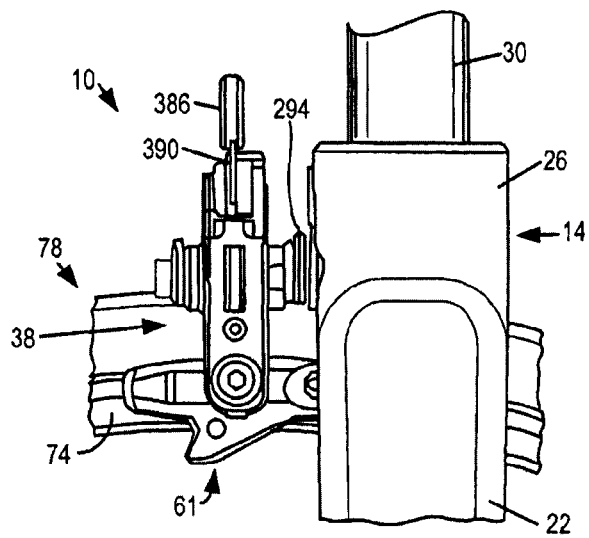
FIG. 3 is a left side view of the center-pull bicycle brake device.

FIG. 1 is a front view of an embodiment of a center-pull bicycle brake device 10 attached to a bicycle frame member in the form of a front fork 14 of a bicycle, FIG. 2 is a right side view of brake device 10, and FIG. 3 is a left side view of brake device 10. Front fork 14 has a typical structure wherein a first fork leg 18 and a second fork leg 22 extend downwardly from a bridging member 26 that is attached to a steering tube 30. Brake device 10 includes a first brake arm 34 and a second brake arm 38, wherein first brake arm 34 is rotatably mounted to first fork leg 18, and second brake arm 38 is rotatably mounted to second fork leg 22. As shown more clearly in FIG. 4, first brake arm 34 includes a first brake arm mounting portion 42 for mounting first brake arm 34 to first fork leg 18, a first brake pad mounting portion 46 and a first control interface portion such as a first control element attachment location such as a first cable mounting portion 50. First brake pad mounting portion 46 has a first brake pad mounting opening 52 for mounting a first brake pad 53 (FIG. 1) in a well-known manner. Similarly, second brake arm 38 includes a second brake arm mounting portion 54 for mounting second brake arm 38 to second fork leg 22, a second brake pad mounting portion 58 and a second control interface portion such as a second control element attachment location such as a second cable mounting portion 62. Second brake pad mounting portion 58 has a second brake pad mounting opening 60 for mounting a second brake pad 61 in a well-known manner. As shown in FIGS. 1-3, first brake pad 53 and second brake pad 61 are adapted to frictionally contact a rim portion 74 of a wheel 78.

First brake arm mounting portion 42 includes a first mounting opening 66 for receiving a first mounting assembly 70 therethrough. First mounting assembly 70 includes a tubular first mounting base 82, nuts 86, 90, a tubular first bushing 94, a washer 98, a spacer 102, a washer 106, a tubular first pivot axle 110, and a first mounting bolt 114. First mounting base 82 includes a first mounting flange 118, a first spring mounting portion 122, a first bushing mounting portion 126 and a first threaded opening 130. First mounting flange 118 is structured to be welded or otherwise attached to first fork leg 18. First spring mounting portion 122 is structured to extend through a coil 134 of a return spring 138, and first bushing mounting portion 126 is structured to be inserted into an opening 142 in first bushing 94. First bushing 94 includes a first flange 146 and a first arm mounting portion 150, wherein first flange 146 abuts against nut 90, and first arm mounting portion 150 extends through first mounting opening 66 in first brake arm mounting portion 42.

First pivot axle 110 includes a first tubular portion 154, a first flange 158, and a first gate bridge supporting portion 162. First tubular portion 154 extends through washer 106, spacer 102, washer 98, first arm mounting portion 150 of first bushing 94, and nuts 86 and 90 until first flange 158 abuts against washer 106. A gate bridge 166 includes a first gate bridge loop 170 and a second gate bridge loop 174, wherein first gate bridge loop 170 is structured to receive first gate bridge supporting portion 162 of first pivot axle 110 therein so that first gate bridge loop 170 abuts against first flange 158 of first pivot axle 110. First mounting bolt 114 extends through first pivot axle 110 and screws into first threaded opening 130 in first mounting base 82 to axially fix first brake arm 34 to first fork leg 18 so that first brake arm 34 is supported by first bushing 94 for rotation around a first pivot axis X1.

The upper portion of first brake arm 34 bends laterally inwardly from first brake arm mounting portion 42 and forms first cable mounting portion 50 at a distal end thereof. First cable mounting portion 50 includes plate-shaped, parallel and arcuate first and second end bead mounting claws 182 and 186 that form a substantially vertically-oriented cable receiving slot 190 therebetween. First end bead mounting claw 182 forms a first cable end bead receiving opening 194 for receiving a cable end bead 198 (FIG. 1) therein, and second end bead mounting claw 186 forms a second cable end bead receiving opening 202 for receiving cable end bead 198 therein.

A spring contacting surface 204 is formed on the laterally inner side surface of first brake arm 34 between first brake arm mounting portion 42 and first brake pad mounting portion 46 for contacting a first spring end 205 of return spring 138. A pair of parallel, spaced-apart roller mounting ears 206 and 210 with corresponding mounting openings 214 and 218 are disposed on first brake arm 34 between first brake arm mounting portion 42 and first cable mounting portion 50. Mounting opening 214 is unthreaded, whereas mounting opening 218 is threaded. Mounting ears 206 and 210 are spaced apart for receiving a tubular spacer 222 and a tubular roller 226 therebetween. Roller 226 is rotatably mounted between roller mounting ears 206 and 210 by a screw 230 that extends through mounting ear 206 and spacer 222 and screws into threaded opening 218.

Second brake arm mounting portion 54 includes a second mounting opening 234 for receiving a second mounting assembly 238 therethrough. Second mounting assembly 238 is substantially the same as first mounting assembly 70. Second mounting assembly 238 includes a tubular second mounting base 242, nuts 246, 250, a tubular second bushing 254, a washer 258, a spacer 262, a washer 266, a tubular second pivot axle 270, and a second mounting bolt 274. Second mounting base 242 includes a second mounting flange 278, a second spring mounting portion 282, a second bushing mounting portion 286 and a second threaded opening 290. Second mounting flange 278 is structured to be welded or otherwise attached to second fork leg 22. Second spring mounting portion 282 is structured to engage a second spring end 294 of return spring 138, and second bushing mounting portion 286 is structured to be inserted into an opening 298 in second bushing 254. Second bushing 254 includes a second flange 302 and a second arm mounting portion 306, wherein second flange 302 abuts against nut 250, and second arm mounting portion 306 extends through second mounting opening 234 in second brake arm mounting portion 54.

Second pivot axle 270 includes a second tubular portion 310, a second flange 314, and a second gate bridge supporting portion 318. Second tubular portion 310 extends through washer 266, spacer 262, washer 258, second arm mounting portion 306 of second bushing 254, and nuts 246 and 250 until second flange 314 abuts against washer 266. Second gate bridge loop 174 of gate bridge 166 is structured to receive second gate bridge supporting portion 318 of second pivot axle 270 therein so that second gate bridge loop 174 abuts against second flange 314. Second mounting bolt 274 extends through second pivot axle 270 and screws into second threaded opening 290 in second mounting base 242 to axially fix second brake arm 38 to second fork leg 22 so that second brake arm 38 is supported by second bushing 254 for rotation around a second pivot axis X2.

Figure 4:
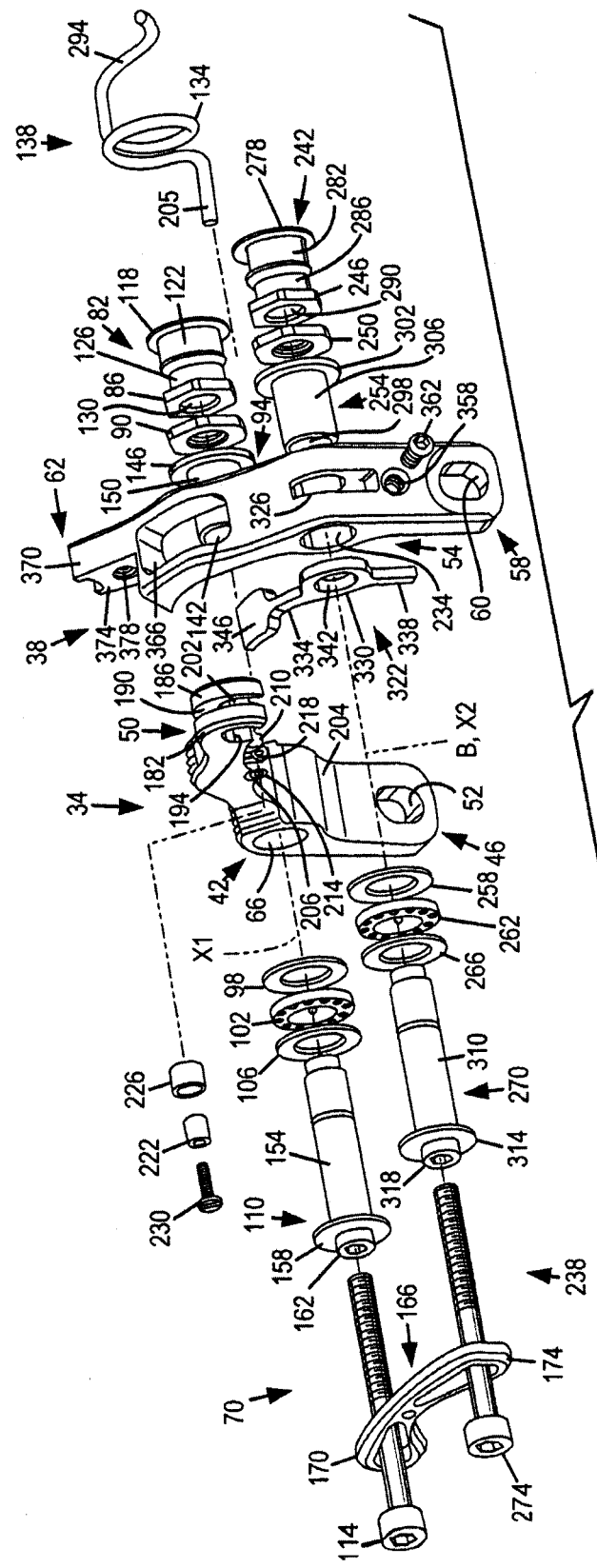
FIG. 4 is an exploded perspective view of the center-pull bicycle brake device.
Figure 5:
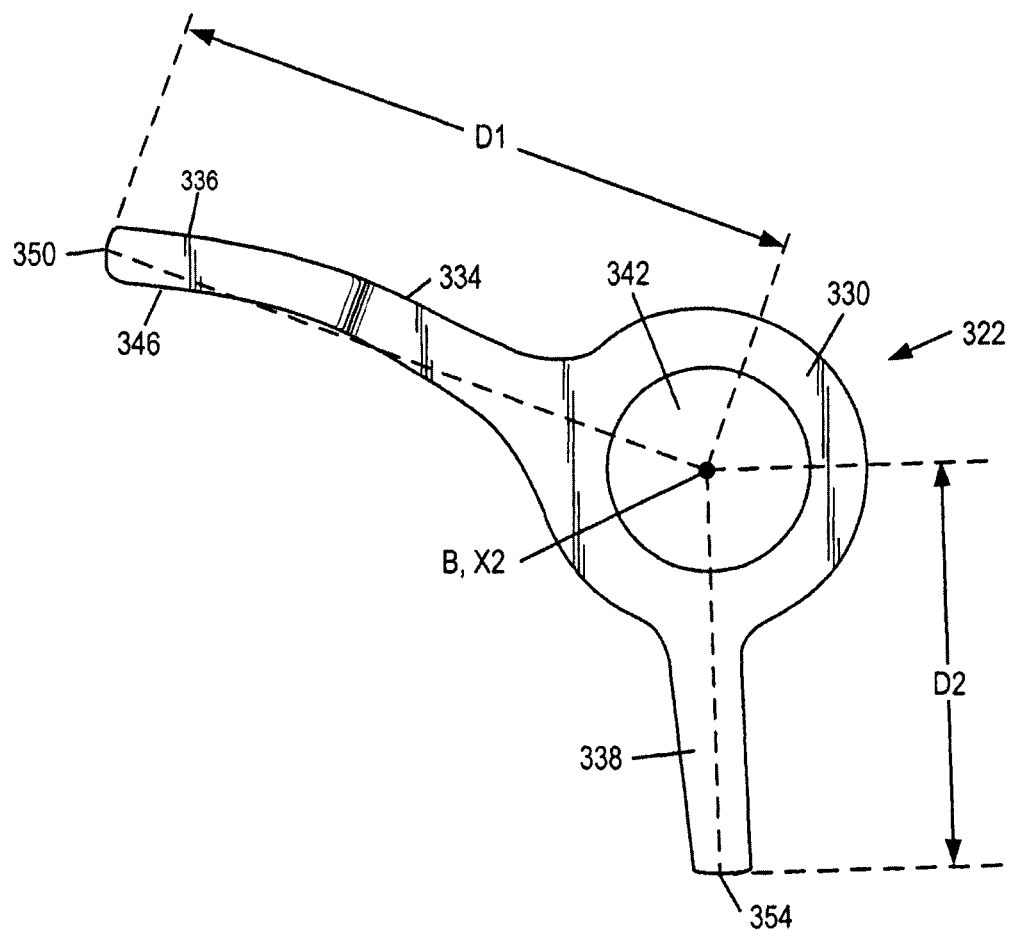
FIG. 5 is a front view of an embodiment of a bias communicating member.

A bias communicating member 322 is structured and dimensioned to be mounted within a vertical mounting groove 326 formed in second brake arm mounting portion 54 of second brake arm 38. In this embodiment, second pivot axis X2 intersects mounting groove 326 so that bias communicating member 322 pivots around a bias communicating member pivot axis B that is coaxial with second pivot axis X2. As shown in FIGS. 4 and 5, bias communicating member 322 comprises a bias communicating member mounting portion 330, a first brake arm interface portion 334 having an upper surface 336, and an axially thin, rod-shaped second brake arm interface portion 338, wherein bias communicating member mounting portion 330 is disposed between first brake arm interface portion 334 and second brake arm interface portion 338. As a result, second brake arm interface portion 338 is disposed between second brake arm mounting portion 54 and second brake pad mounting portion 58 of second brake arm 38 when bias communicating member 322 is mounted in mounting groove 326. Bias communicating member mounting portion 330 is formed as a generally annular member having an opening 342 dimensioned to receive second arm mounting portion 306 of second bushing 254 therethrough. The end portion of first brake arm interface portion 334 is formed as an axially thick paddle 346 for engaging roller 226 mounted to first brake arm 34. As shown in FIG. 5, first brake arm interface portion 334 has a first brake arm interface end 350, and second brake arm interface portion 338 has a second brake arm interface end 354. A distance D1 from bias communicating member pivot axis B to first brake arm interface end 350 is greater than a distance D2 from bias communicating member pivot axis B to second brake arm interface end 354.

A threaded opening 358 is formed in second brake arm 38 between second brake arm mounting portion 54 and second brake pad mounting portion 58 for receiving an adjustment member in the form of an adjustment screw 362 therein. The tip of adjustment screw 362 contacts second brake arm interface portion 338 of bias communicating member 322 for adjusting the relative position between second brake arm interface portion 338 and second brake arm 38 in a continuous manner.

A passage 366 in the form of an opening is formed in second brake arm 38 between second brake arm mounting portion 54 and second cable mounting portion 62. In this embodiment, passage 366 is formed as a substantially circumferentially-closed opening such as a completely circumferentially-closed opening. Passage 366 is dimensioned such that it is capable of receiving the portion of first brake arm 34 above first brake arm mounting portion 42 therethrough. As a result, when brake device 10 is viewed along first pivot axis X1 and second pivot axis X2, first brake arm 34 intersects second brake arm 38 so that first cable mounting portion 50 of first brake arm 34 and second cable mounting portion 62 of second brake arm 38 are located on opposite sides of the intersection.

Second cable mounting portion 62 of second brake arm 38 extends upwardly from passage 366 and includes a cable mounting wall 370 with a side surface 374, wherein a generally horizontally-oriented threaded opening 378 is formed at side surface 374 for receiving a cable mounting bolt 379 (FIG. 1) therein. First cable mounting portion 50 and second cable mounting portion 62 are configured such that, when brake device 10 is viewed perpendicular to first and second pivot axes X1 and X2 and first and second pivot axes X1 and X2 are horizontal, cable receiving slot 190 in first brake arm 34 substantially aligns with side surface 374 on second brake arm 38.

A synchronizing link 380 (FIG. 6) is provided by some of the above structures for moving first brake arm 34 and second brake arm 38 in synchronization when brake device 10 is operated. More specifically, synchronizing link 380 comprises a first link portion 381 operatively coupled to first brake arm 34 and a second link portion 382 operatively coupled to second brake arm 38. In this embodiment, first link portion 381 comprises roller 226, and second link portion 382 comprises upper surface 336 of first brake arm interface portion 334 of bias communicating member 322, wherein upper surface 336 of first brake arm interface portion 334 contacts roller 226.

As shown in FIGS. 1-3, in this embodiment, an intermediate control element comprises a generally triangular control plate 386, a first intermediate control wire 390, and a second intermediate control wire 394. First intermediate control wire 390 has a first end attached to the lower right vertex of control plate 386 and a second end that extends through cable receiving slot 190 in first cable mounting portion 50 of first brake arm 34 and attaches to cable end bead 198. Second intermediate control wire 394 has a first end attached to the lower left vertex of control plate 386 and a second end attached to side surface 374 of second cable mounting portion 62 of second brake arm 38 by cable mounting bolt 382. A primary control element in the form of a primary control wire 398 is attached to the upper vertex of control plate 386.

Figure 6:
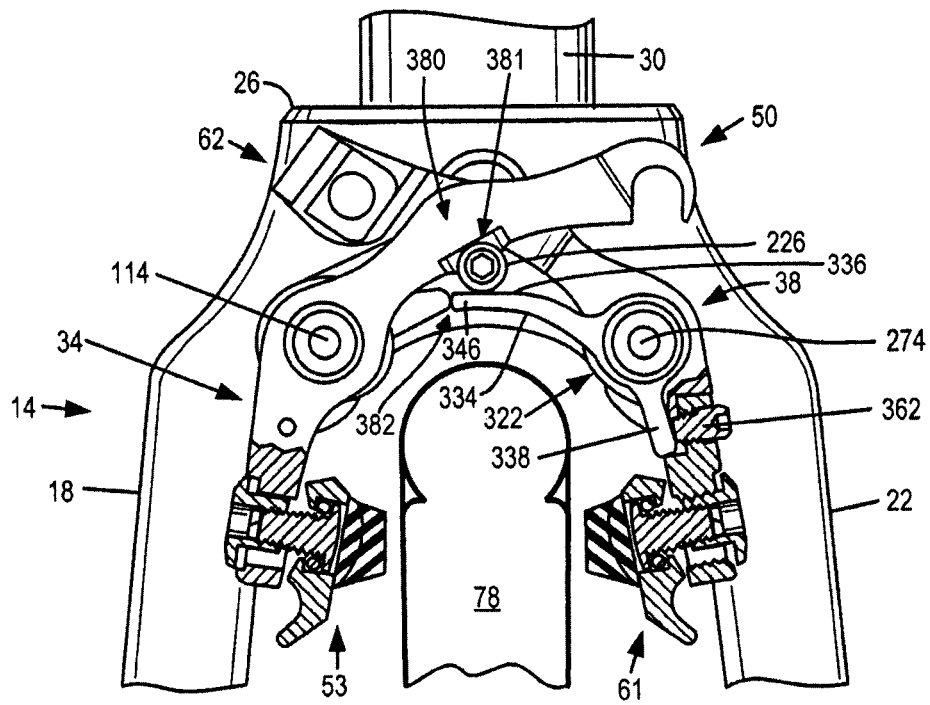
FIG. 6 is a partial cross-sectional view of the center-pull bicycle brake device in a brake-released position.
Figure 7:
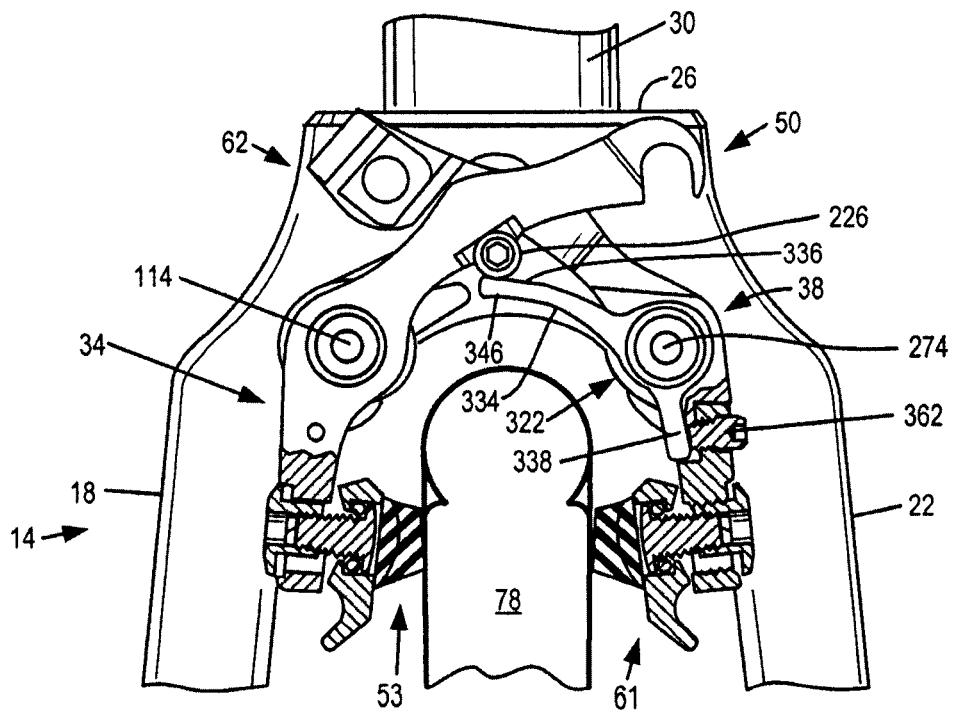
FIG. 7 is a partial cross-sectional view of the center-pull bicycle brake device in a brake-engaged position.

Operation of the device is shown in FIGS. 6 and 7, wherein FIG. 6 is a partial cross-sectional view of brake device 10 in a brake-released position, and FIG. 7 is a partial cross-sectional view of brake device 10 in a brake-engaged position. When primary control wire 398 is pulled upwardly, first cable mounting portion 50 of first brake arm 34 and second cable mounting portion 62 of second brake arm 38 are pulled upwardly, thereby causing first brake arm 34 to rotate counterclockwise and causing second brake arm 38 to rotate clockwise. If second brake arm 38 experiences a greater operating force than first brake arm 34, then the tip of adjusting screw 362 presses against second brake arm interface portion 338 of bias communicating member 322, and upper surface 336 of first brake arm interface portion 334 of bias communicating member 322 presses against roller 226 attached to first brake arm 34 to synchronize the movement of first brake arm 34 and second brake arm 38. Synchronizing link 380 thus communicates a synchronizing force from second brake arm 38 to first brake arm 34 so that first brake pad 53 and second brake pad 61 synchronously apply a braking force to rim portion 74 of wheel 78.

When primary control wire 398 is released, return spring 138 biases first brake arm 34 clockwise to move first brake pad 53 to the brake released position. In this case, synchronizing link 380 communicates a synchronizing force from first brake arm 34 to second brake arm 38. More specifically, since first brake arm 34 experiences a greater operating force than second brake arm 38 as a result of return spring 138, the clockwise rotation of first brake arm 34 is communicated to paddle 346 of first brake arm interface portion 334 of bias communicating member 322 via roller 226, thereby causing bias communicating member 322 to rotate counterclockwise. The counterclockwise rotation of bias communicating member 322 is communicated to adjusting screw 362 in second brake arm 38 via second brake arm interface portion 338, thereby causing second brake arm 38 to rotate counterclockwise to move second brake pad 61 to the brake released position. Thus, synchronizing link 380 ensures that first brake arm 34 and second brake arm 38 pivot synchronously in both the brake applying direction and the brake releasing direction.

Unlike prior art brake devices, only one return spring is required to rotate both first brake arm 34 and second brake arm 38 to the brake released positions. Second brake arm 38 is unbiased except for the biasing force from return spring 138 received from bias communicating member 322. As a result, less operating force is required to operate brake device 10. Furthermore, since distance D1 from bias communicating member pivot axis B to first brake arm interface end 350 is greater than a distance D2 from bias communicating member pivot axis B to second brake arm interface end 354, bias communicating member 322 functions as a lever that provides a mechanical advantage so that the biasing force of return spring 138 is efficiently communicated from first brake arm 34 to second brake arm 38. Finally, the position of first brake pad 53 relative to second brake pad 61 may be adjusted easily using an adjustment mechanism in the form of an adjusting screw 362 to assure symmetrical positioning of first brake pad 53 and second brake pad 61 relative to wheel 78.

Since cable receiving slot 190 in first brake arm 34 substantially axially aligns with side surface 374 on second brake arm 38 when brake device 10 is viewed perpendicular to first and second pivot axes X1 and X2, first intermediate control wire 390 likewise axially aligns with second intermediate control wire 394. As a result, the axial forces applied to first brake arm 34 and second brake arm 38 by first intermediate control wire 390 and second intermediate control wire 394 are balanced, and torsional forces applied to first intermediate control wire 390 and second intermediate control wire 394 are reduced, thereby reducing wear on the control wires. Furthermore, in this embodiment, first intermediate control wire 390 and second intermediate control wire 394 are substantially axially centered relative to first brake arm 34 and second brake arm 38 when brake device 10 is viewed perpendicular to first and second pivot axes X1 and X2. This configuration further balances the axial forces applied to first brake arm 34 and second brake arm 38.

Of course, modifications may be employed to the above embodiment without departing from the spirit and scope of the present invention. For example, bias communicating member 322 need not be mounted within mounting groove 326. Bias communicating member 322 could be mounted outside second brake arm 38, or bias communicating member 322 could be mounted on or about first brake arm 34. Other adjusting members could be provided for adjusting the relative position between second brake arm 38 and second brake arm interface portion 338 of bias communicating member 322. For example a spacer or some other member or structure could be disposed between second brake arm 38 and second brake arm interface portion 338 for adjusting the relative position between second brake arm 38 and second brake arm interface portion 338 in a discrete or step-wise manner. Passage 366 need not be formed as a bounded opening as long as passage 366 accommodates the passage of first brake arm 34 therethrough.

Figure 8:
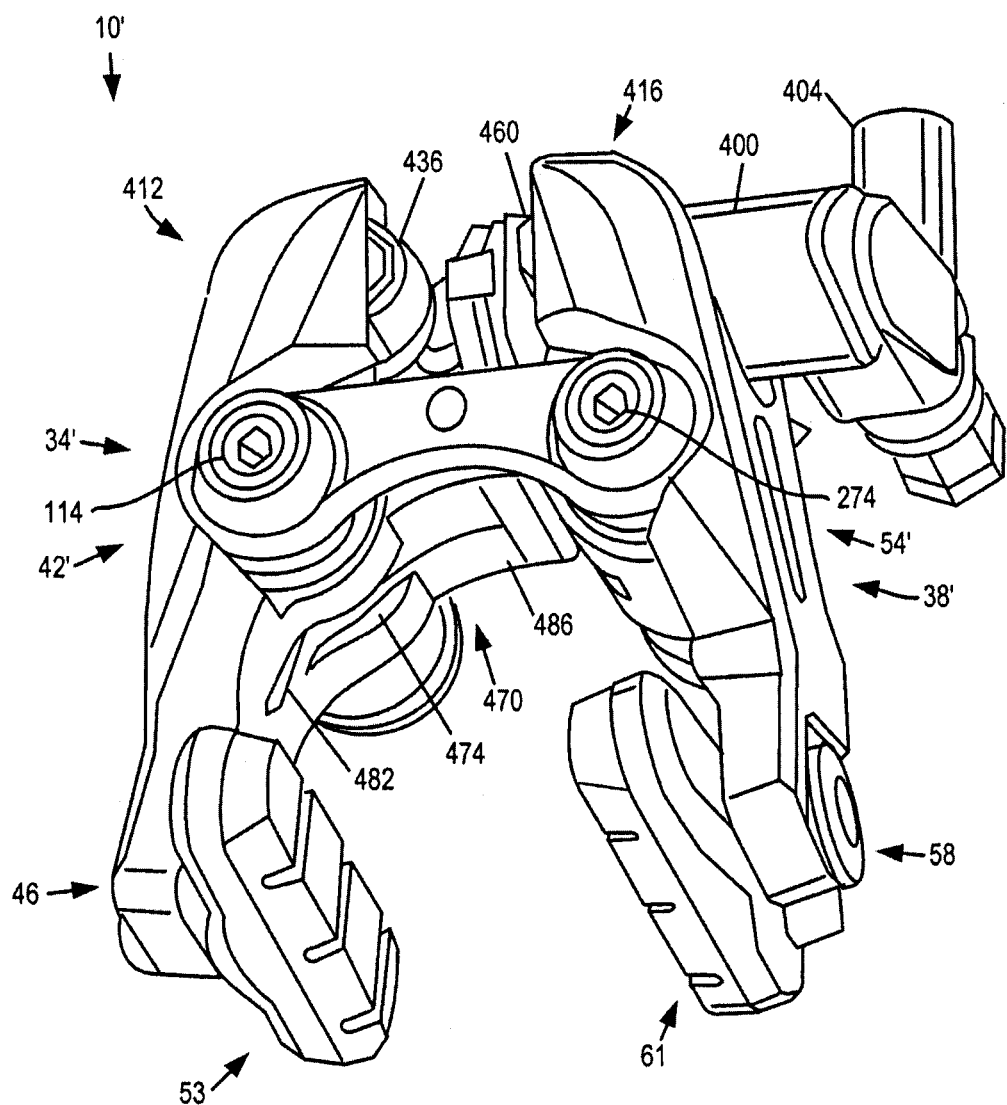
FIG. 8 is a bottom perspective view of another embodiment of a bicycle brake device.
Figure 9:
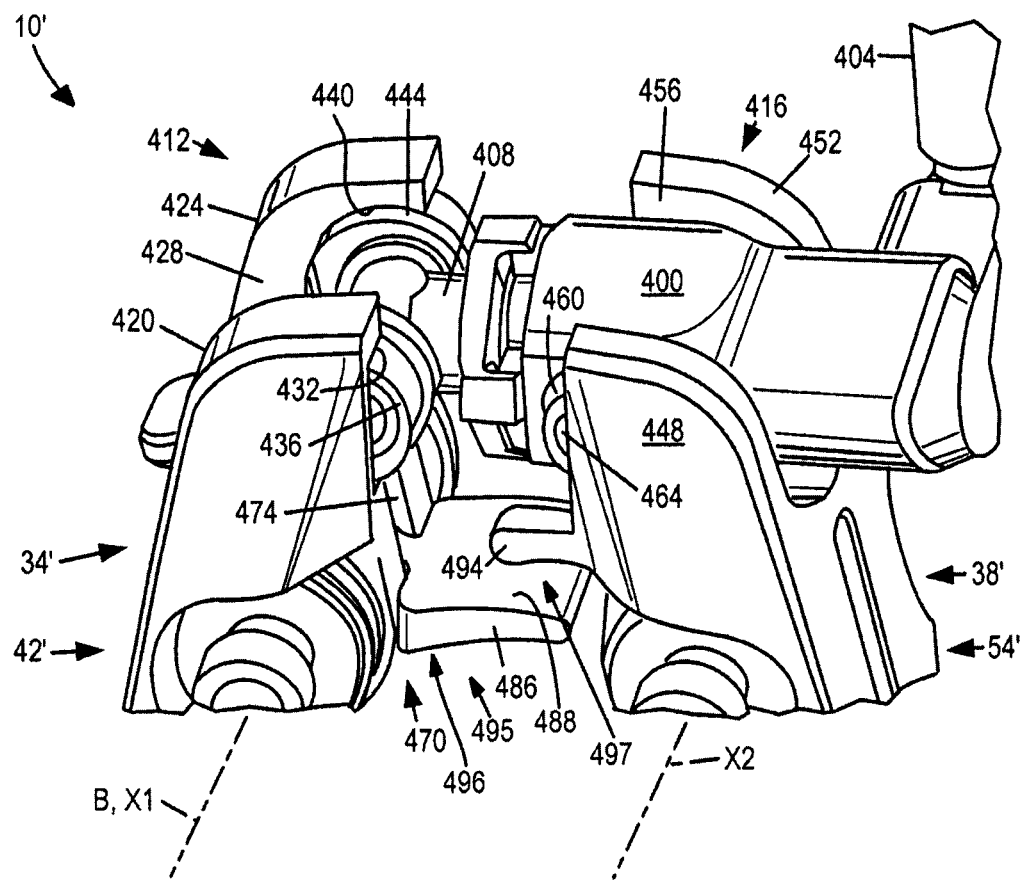
FIG. 9 is a detailed view of top portions of the bicycle brake device shown in FIG. 8.
Figure 10:
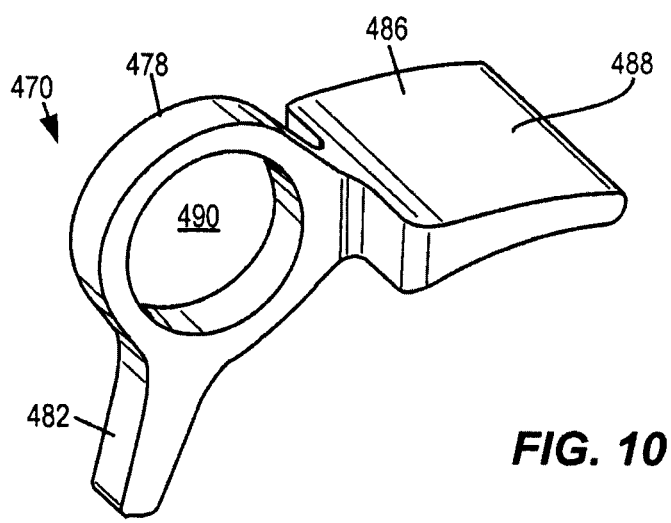
FIG. 10 is a perspective view of an embodiment of a bias communicating member used in the embodiments shown in FIGS. 8 and 9.

While brake device 10 was operated using primary control wire 398, control plate 386, first intermediate control wire 390 and second intermediate control wire 394, the bias communicating function and/or the synchronizing function performed by bias communicating member 322 may be applied to other brake devices. For example FIGS. 8-10 illustrate another embodiment of a brake device 10' that includes inventive features. This embodiment includes a first brake arm 34' and a second brake arm 38'. First brake arm 34' and second brake arm 38' share many features as first brake arm 34 and second brake arm 38 in the first embodiment, so only the differences will be described.

In this embodiment, first brake arm 34' and second brake arm 38' are operated by a piston-operating hydraulic cylinder 400 that receives hydraulic fluid from a hydraulic fluid line 404 and selectively extends and retracts a T-shaped piston shaft 408 in response to the pressure of hydraulic fluid received through hydraulic fluid line 404. Piston shaft 408 is biased toward a retracted position by a return spring (not shown) disposed within hydraulic cylinder 400 in a well-known manner. To accommodate this structure, first brake arm 34' includes a first control interface portion 412, and second brake arm 38' includes a second control interface portion 416. First control interface portion 412 includes parallel and arcuate first and second shaft mounting claws 420 and 424 that form a substantially vertically-oriented slot 428 therebetween. First shaft mounting claw 420 forms a first cartridge bearing receiving recess 432 for receiving a first cartridge bearing 436 therein, and second shaft mounting claw 424 forms a second cartridge bearing receiving opening 440 for receiving a second cartridge bearing 444 therein. First cartridge bearing 436 and second cartridge bearing 444 are rotatably supported on opposite ends of the T-shaped piston shaft 408.

Second control interface portion 416 likewise includes parallel and arcuate first and second shaft mounting claws 448 and 452 that form a substantially vertically-oriented slot 456 therebetween and having sufficient width to receive hydraulic cylinder 400 therein. First shaft mounting claw 448 forms a first cartridge bearing receiving recess (not shown, but similar to first cartridge bearing receiving recess 432) for receiving an annular first bushing 460 therein, and second shaft mounting claw 452 forms a second cartridge bearing receiving opening (not shown, but similar to second cartridge bearing receiving opening 440) for receiving an annular second bushing (not shown, but similar to first bushing 460) therein. First bushing 460 is mounted to a first mounting shaft 464 that extends from the side of hydraulic cylinder 400, and the second bushing is similarly mounted to a second mounting shaft (not shown) extending from the opposite side of hydraulic cylinder 400.

In this embodiment, a bias communicating member 470 is structured and dimensioned to be mounted within a vertical mounting groove 474 formed in first brake arm mounting portion 42' of first brake arm 34'. In this embodiment, first pivot axis X1 intersects mounting groove 474 so that bias communicating member 470 pivots around a bias communicating member pivot axis B that is coaxial with first pivot axis X1. As shown in FIG. 10, bias communicating member 470 comprises a bias communicating member mounting portion 478, an axially thin, rod-shaped first brake arm interface portion 482, and a second brake arm interface portion 486 having an upper surface 488, wherein bias communicating member mounting portion 478 is disposed between first brake arm interface portion 482 and second brake arm interface portion 486. As a result, first brake arm interface portion 482 is disposed between first brake arm mounting portion 42' and first brake pad mounting portion 46 of first brake arm 34' when bias communicating member 470 is mounted in mounting groove 474. Bias communicating member mounting portion 478 is formed as a generally annular member having an opening 490 dimensioned to receive first arm mounting portion 150 (FIG. 4) of first bushing 94 therethrough. Second brake arm interface portion 486 is formed as an axially thick paddle cam for engaging a thin rod-shaped cam follower 494 mounted to second brake arm 38' between second brake arm mounting portion 54' and second control interface portion 416.

A synchronizing link 495 (FIG. 9) is provided for moving first brake arm 34' and second brake arm 38' in synchronization when brake device 10' is operated. More specifically, synchronizing link 495 comprises a first link portion 496 operatively coupled to first brake arm 34' and a second link portion 497 operatively coupled to second brake arm 38'. In this embodiment, first link portion 496 comprises upper surface 488 of second brake arm interface portion 486 of bias communicating member 470, and second link portion 497 comprises cam follower 494.

If first brake arm 34' experiences a greater operating force than second brake arm 38' when hydraulic cylinder 400 extends piston shaft 408 to bias first brake arm 34' to rotate counterclockwise, then the side of first brake arm 34' presses against first brake arm interface portion 482 of bias communicating member 470, and upper surface 488 of second brake arm interface portion 486 of bias communicating member 470 presses against cam follower 494 attached to second brake arm 38' to communicate a synchronizing biasing force from piston shaft 408 to second brake arm 38' and thereby synchronize the movements of first brake arm 34' and second brake arm 38'.

If second brake arm 38' experiences a greater operating force than first brake arm 34' when hydraulic cylinder 400 retracts piston shaft 408 to bias second brake arm 38' to rotate counterclockwise, then the counterclockwise rotation of second brake arm 38' communicates a synchronizing force to upper surface 488 of second brake arm interface portion 486 of bias communicating member 470 via cam follower 494, thereby causing bias communicating member 470 to rotate clockwise. The clockwise rotation of bias communicating member 470 is communicated to first brake arm 34' via first brake arm interface portion 482 of bias communicating member 470, thereby causing first brake arm 34' to rotate clockwise to move first brake pad 53 to the brake released position and synchronizing the movements of first brake arm 34' and second brake arm 38'.

Figure 11:
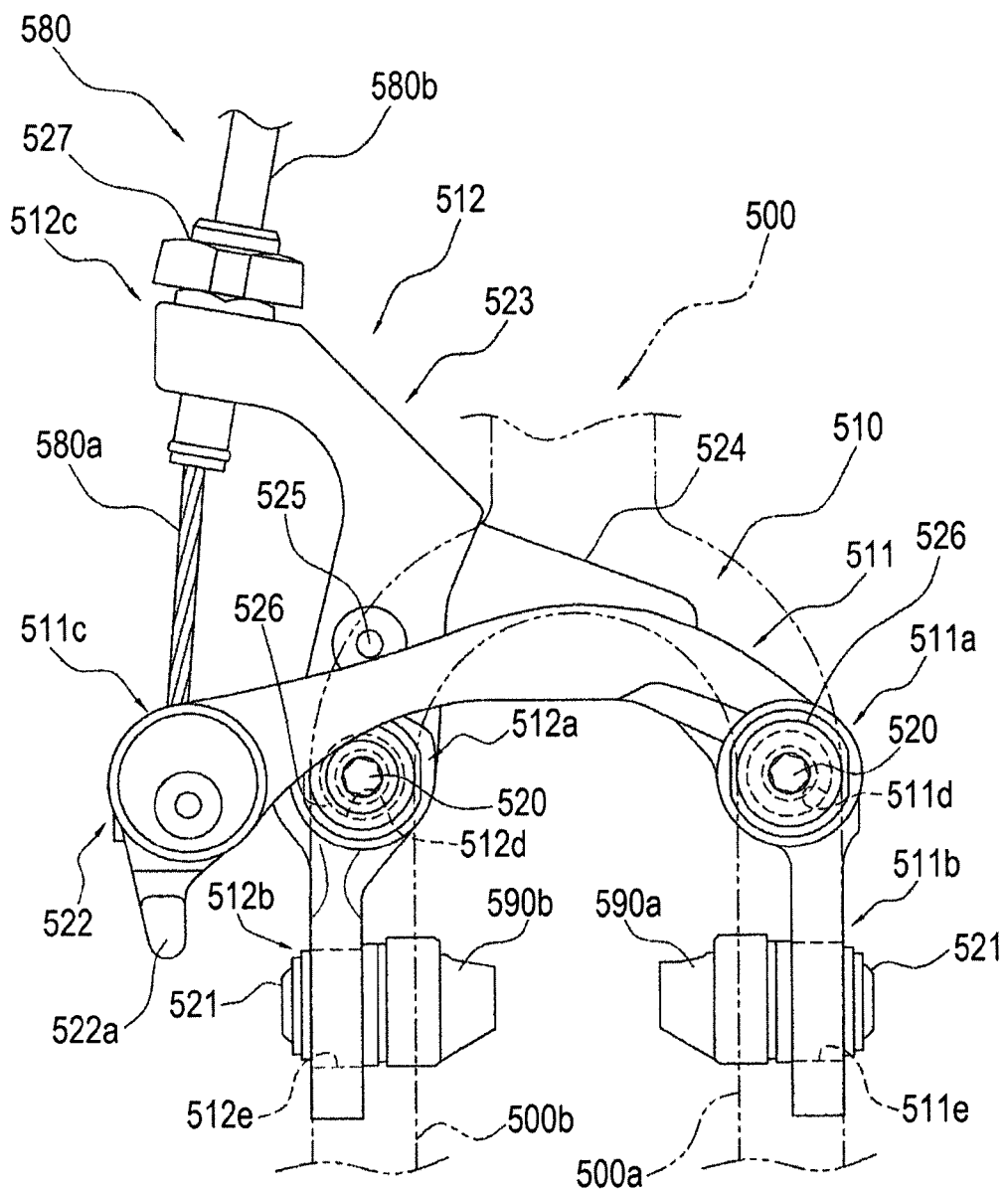
FIG. 11 is a front view of an embodiment of a side-pull bicycle brake device attached to a front fork of a bicycle.
Figure 12:
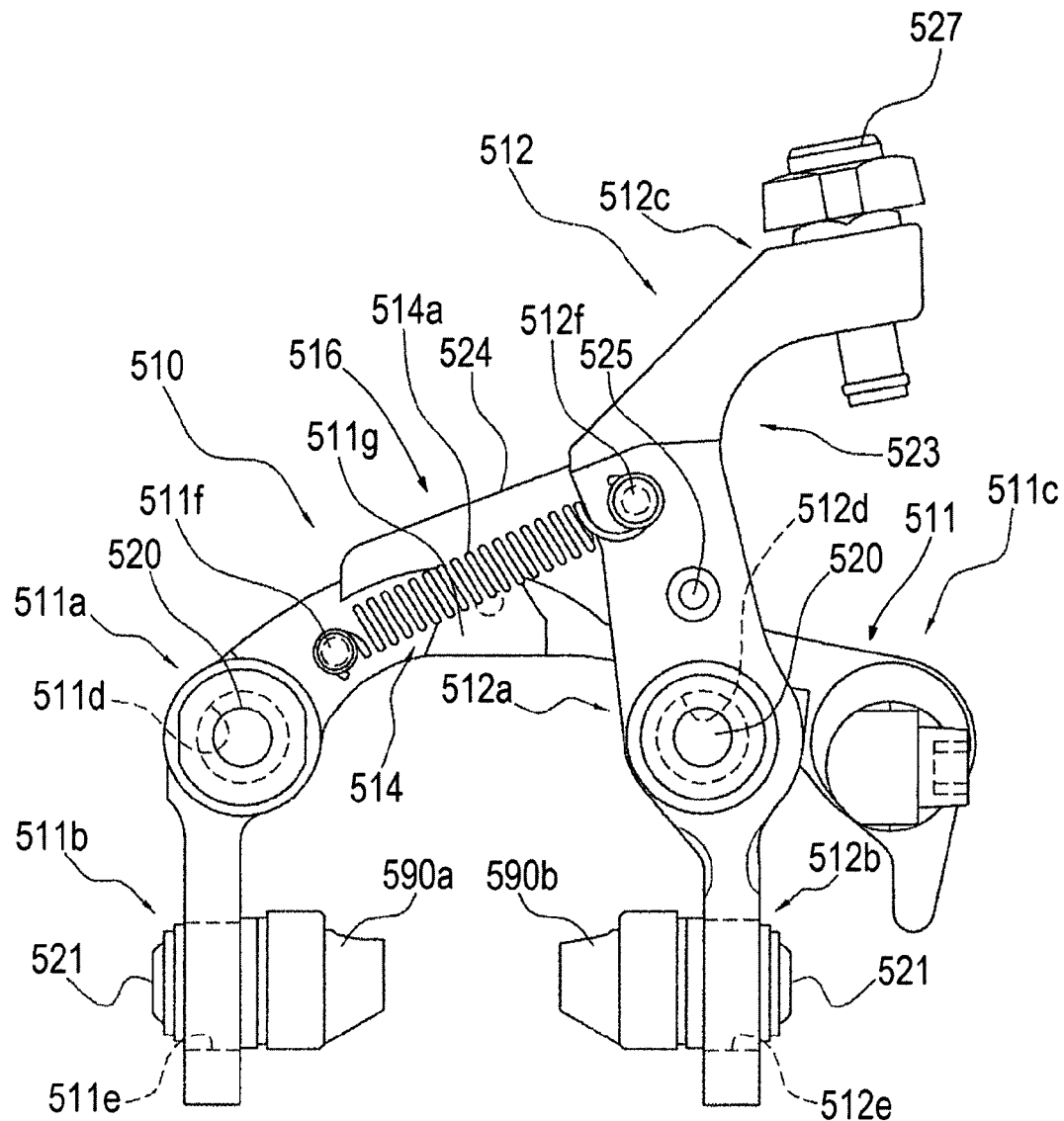
FIG. 12 is a rear view of the side-pull bicycle brake device.
Figure 13:
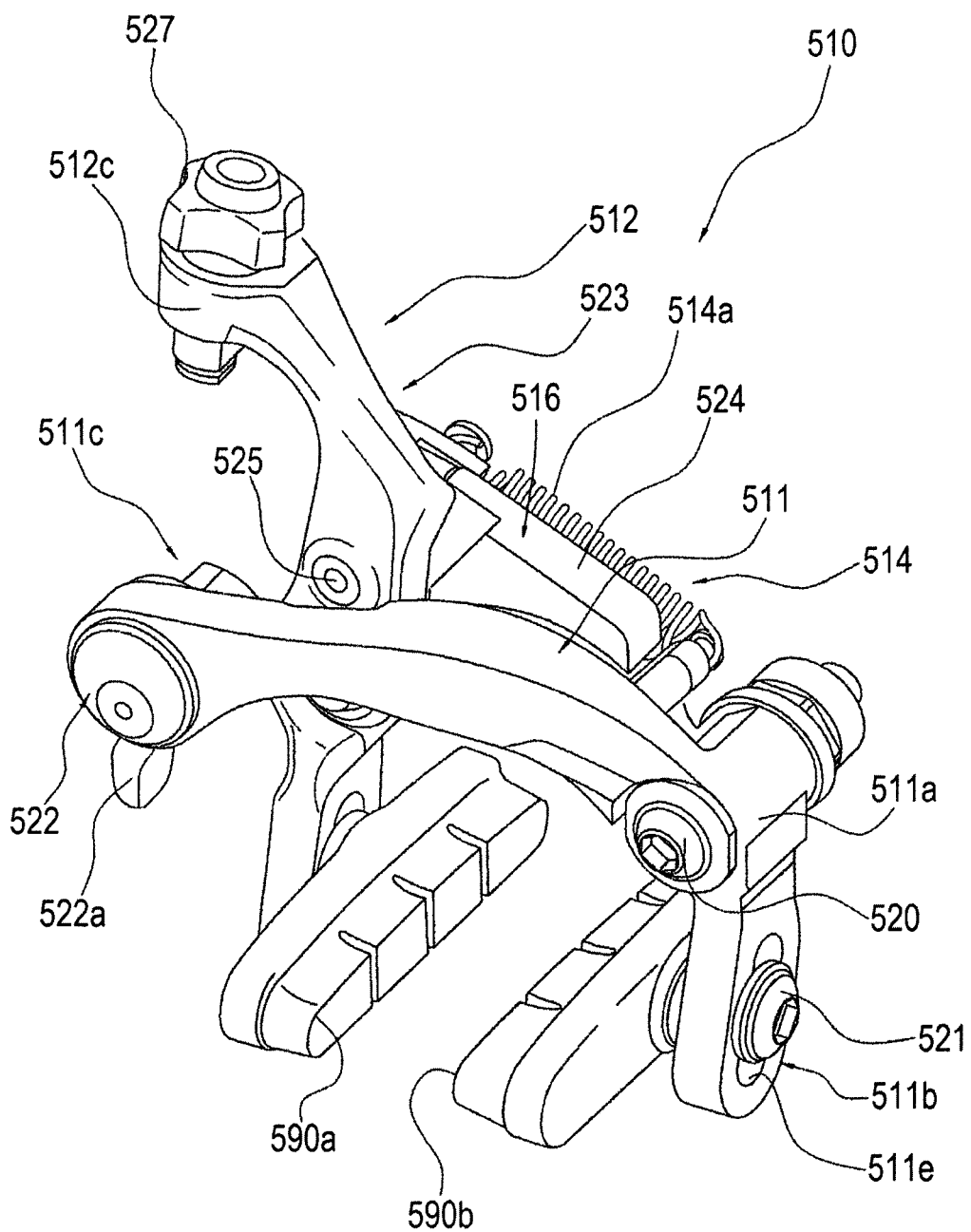
FIG. 13 is a front perspective view of the side-pull bicycle brake device.
Figure 14:
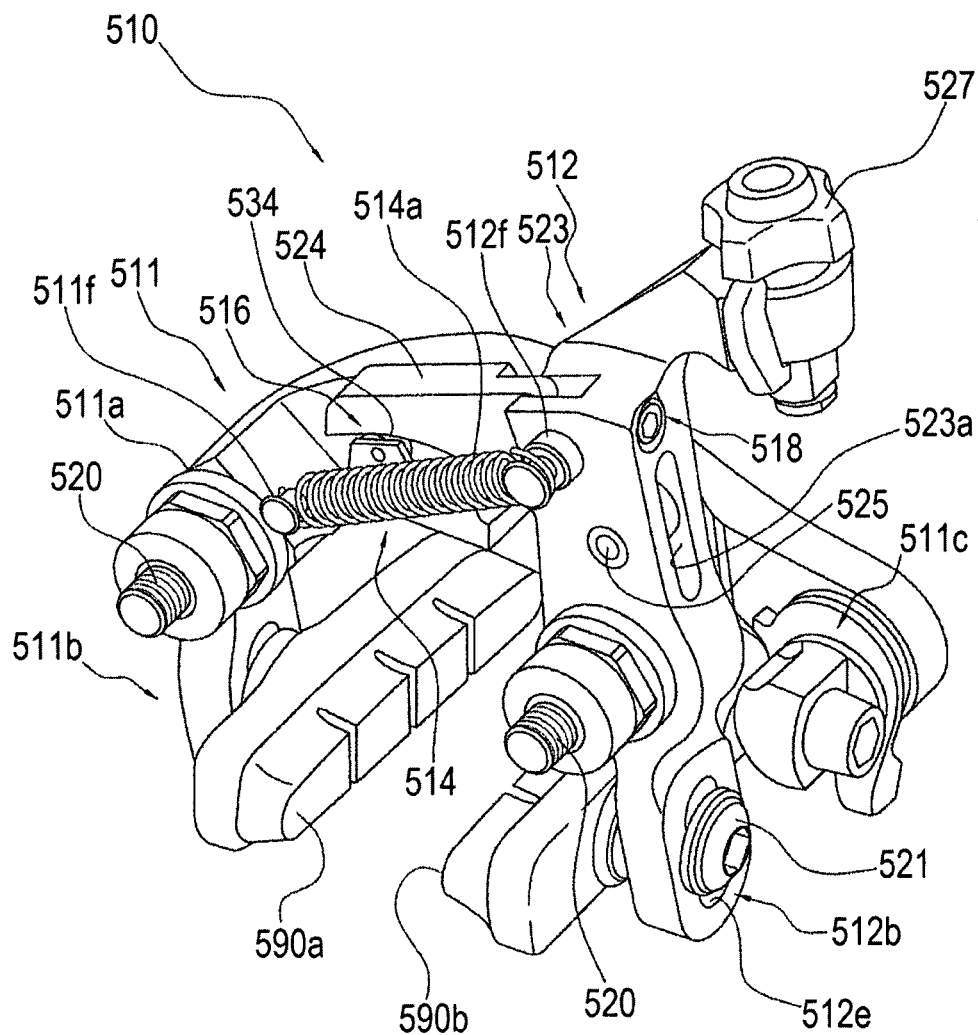
FIG. 14 is a rear perspective view of the side-pull bicycle brake device.

FIG. 11 is a front view of another embodiment of a bicycle brake device 510 attached to a front fork 500 of a bicycle, FIG. 12 is a rear view of brake device 510, FIG. 13 is a front perspective view of brake device 510, and FIG. 14 is a rear perspective view of brake device 510. In this embodiment, brake device 510 is a side-pull front brake device mounted to a pair of fork blades 500a and 500b of a front fork 500 of a bicycle.

Figure 15:
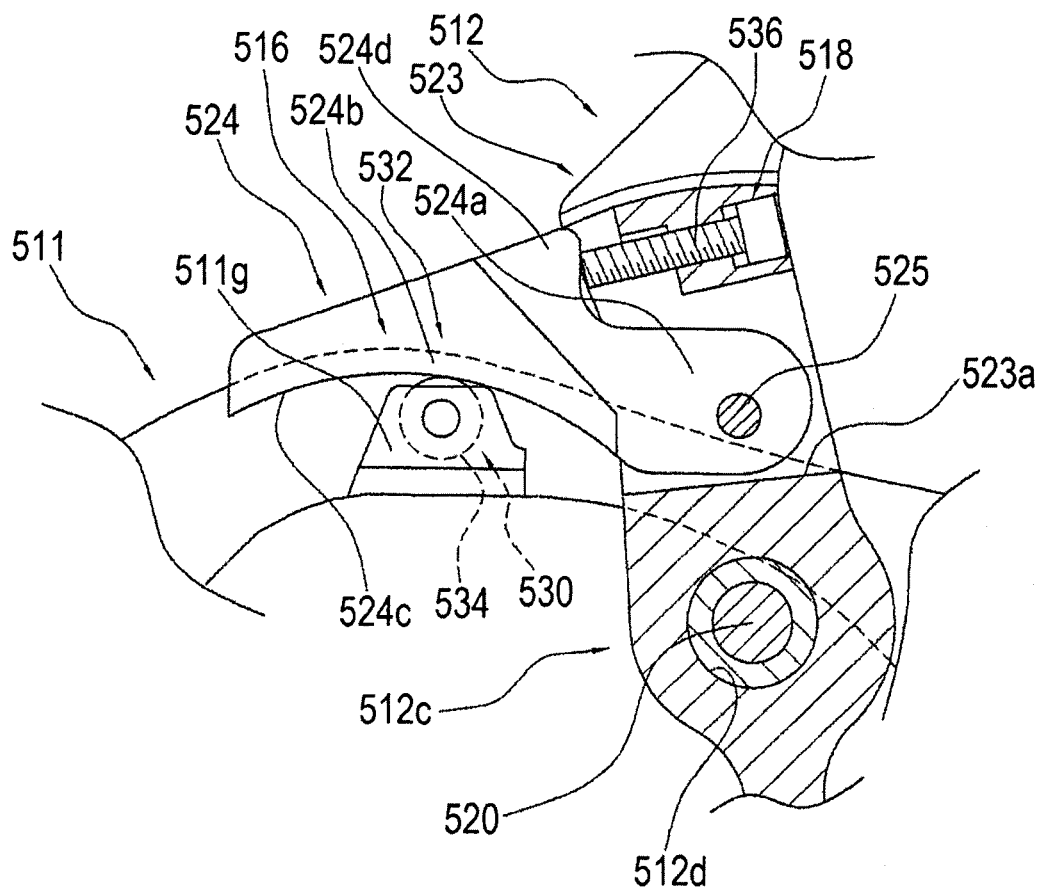
FIG. 15 is a detailed view of an embodiment of a synchronizing link.

Brake device 510 includes a first brake arm 511, a second brake arm 512, a biasing member 514 (FIG. 12), a synchronizing link 516 (FIG. 15), and an adjustment mechanism 518 (FIG. 15). First brake arm 511 may be made of metal such as aluminum alloy, and in this embodiment first brake arm 511 is curved into an approximately C shape. First brake arm 511 includes a first brake arm mounting portion 511a pivotally mountable to left-side fork blade 500a, a first brake pad mounting portion 511b to which a first brake pad 590a is mounted, and a first control interface portion in the form of a first cable mounting portion 511c to which an inner cable 580a of a brake operating cable (Bowden cable) 580 is mounted. As shown in FIG. 12, a first spring hooking portion 511f is provided on a rear surface of first brake arm 511 for hooking one end of biasing member 514. First spring hooking portion 511f is configured as a pin member having a basal end fixed to the rear surface of first brake arm 511 and a large-diameter free-end head portion.

First brake arm mounting portion 511a has a bushing hole 511d into which a bushing 526 that supports a mounting bolt 520 for mounting first brake arm mounting portion 511a to fork blade 500a is fitted. First brake pad mounting portion 511b extends substantially linearly downward from first brake arm mounting portion 511a. First brake pad mounting portion 511b has a first brake pad mounting opening 511e through which a brake pad fixing bolt 521 for fixing first brake pad 590a extends. A roller bracket 511g (FIG. 15) is formed integrally with the rear surface of first brake arm 511, and a roller 534 is rotatably supported by roller bracket 511g.

First cable mounting portion 511c curves from first brake arm mounting portion 511a and extends to the left side in FIG. 11. A quick release mechanism 522 for quickly opening first brake arm 511 and second brake arm 512 through a one-touch operation is provided at the distal end of first cable mounting portion 511c. Quick release mechanism 522 has a lever member 522a, and when lever member 522a is rotated clockwise from the position shown in FIG. 11, inner cable 580a is loosened to open first brake arm 511 and second brake arm 512 so that the wheel can be easily replaced.

Second brake arm 512 has a second brake arm mounting portion 512a pivotally mountable to fork blade 500b, a second brake pad mounting portion 512b to which a second brake pad 590b is mounted, and a second control interface portion in the form of a second cable mounting portion 512c to which an outer casing 580b of brake operating cable 580 is mounted. Second brake arm 512 includes a second brake arm body 523 that may be made of a metal such as an aluminum alloy. Second brake arm mounting portion 512a, second brake pad mounting portion 512b, and second cable mounting portion 512c are formed by second brake arm body 523. A second spring hooking portion 512f (FIG. 12) for hooking the other end of biasing member 514 is provided on a rear surface of second brake arm body 523. Second spring hooking portion 512f is configured as a pin member having a basal end fixed to the rear surface of second brake arm body 523 and a large-diameter free-end head portion.

Second brake arm mounting portion 512a has a bushing hole 512d into which a bushing 526 that supports a mounting bolt 520 for mounting second brake arm mounting portion 512a to fork blade 500b is fitted. Second brake pad mounting portion 512b is disposed so as to oppose first brake pad mounting portion 511b and extends substantially linearly downward from second brake arm mounting portion 512a. Second brake pad mounting portion 512b has a second brake pad mounting opening 512e through which a brake pad fixing bolt 521 for fixing second brake pad 590b extends. An outer casing locking portion 527 that is capable of adjusting the position of outer casing 580b relative to inner cable 580a is provided on second cable mounting portion 512c.

As shown more clearly in FIGS. 14 and 15, a bias communicating member in the form of a plate-shaped link member 524 that may be made of metal such as aluminum alloy is pivotably coupled to second brake arm body 523 through a pivot shaft 525. Link member 524 has a bias communicating member mounting portion in the form of a thin-walled pivot coupling portion 524a and a first brake arm interface portion in the form of an integrally-formed contact portion 524b for interfacing with first brake arm 511 at a location offset from pivot coupling portion (bias communicating member mounting portion) 524a. Pivot coupling portion 524a is disposed within a vertically elongated slot 523a formed in second brake arm body 523 and is pivotably supported by pivot shaft 525 for pivoting around a bias communicating member pivot axis defined by pivot shaft 525. A lower surface 524c of contact portion 524b is curved in an arc shape.

Biasing member 514 biases first brake arm 511 and second brake arm 512 in a brake releasing direction, i.e., in a direction in which first brake pad mounting portion 511b and second brake pad mounting portion 512b are separated from each other. In this embodiment, biasing member 514 comprises a coil spring 514a.

Synchronizing link 516 is provided for moving first brake arm 511 and second brake arm 512 in synchronization when brake device 510 is operated. As shown in FIG. 15, synchronizing link 516 comprises a first link portion 530 operatively coupled to first brake arm 511 and a second link portion 532 operatively coupled to second brake arm 512. In this embodiment, first link portion 530 comprises roller 534, and second link portion 532 comprises lower surface 524c of contact portion 524b of link member 524.

Adjustment mechanism 518 is provided for adjusting the relative position between second brake arm body 523 and link member 524. Such adjustment allows the distance between first brake shoe 590a and second brake shoe 590b to be adjusted so that the distance from first brake shoe 590a to the wheel rim and the distance from second brake shoe 590b to the wheel rim are the same. As shown in FIG. 15, adjustment mechanism 518 includes an adjustment screw 536 that screws into second brake arm body 523 above slot 523a. Adjustment screw 536 is obliquely disposed so as to be contactable with a stepped portion 524d of link member 524 between pivot coupling portion 524a and contact portion 524b. Stepped portion 524d functions as a second brake arm interface portion for interfacing with second brake arm 512 at a location offset from pivot coupling portion (bias communicating member mounting portion) 524a. Since second brake arm body 523 is biased in the brake releasing direction (counterclockwise FIG. 15) by biasing member 514, adjustment screw 536 always contacts stepped portion 524d of link member 524, and lower surface 524c of link member 524 always contacts roller 534. Thus, when adjustment screw 536 is loosened, first brake arm 511 and second brake arm 512 pivot in the brake releasing direction. Conversely, when adjustment screw 536 is tightened, first brake arm 511 and second brake arm 512 pivot in the braking direction.

When a brake lever connected to brake operating cable 580 is operated, first brake arm 511 is pulled by inner cable 580a to pivot counterclockwise in FIG. 15 in the brake applying direction. If first brake arm 511 experiences a greater operating force than second brake arm 512, then roller 534 presses lower surface 524c of contact portion 524b of link member 524, link member 524 presses against adjustment screw 536, and second brake arm body 523 pivots clockwise. Synchronizing link 516 thus communicates a synchronizing force from first brake arm 511 to second brake arm 512 so that first brake pad 590a and second brake pad 590b synchronously apply a braking force to the wheel rim. When the brake lever is released, first brake arm 511 and second brake arm 512 pivot in the brake releasing direction as a result of the biasing force of biasing member 514. If second brake arm 512 experiences a greater operating force than first brake arm 511, then adjustment screw 536 presses against stepped portion 524d of link member 524, and lower surface 524c of link member 524 presses against roller 534. As a result, synchronizing link 516 communicates a synchronizing force from second brake arm 512 to first brake arm 511. Thus, synchronizing link 516 ensures that first brake arm 511 and second brake arm 512 pivot synchronously in both the brake applying direction and the brake releasing direction.

Figure 16:
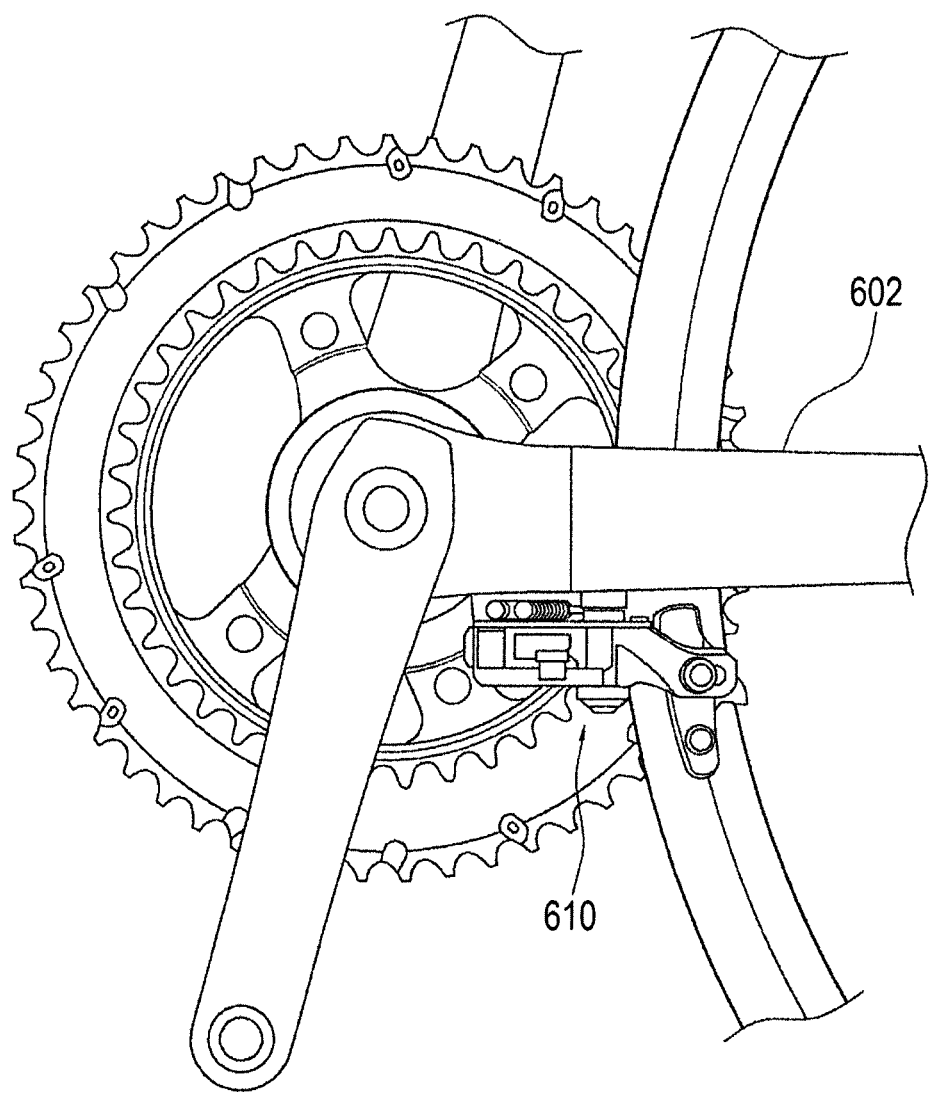
FIG. 16 is a side view of an alternative embodiment of a side-pull bicycle brake device attached to a rear chainstay of a bicycle.
Figure 17:
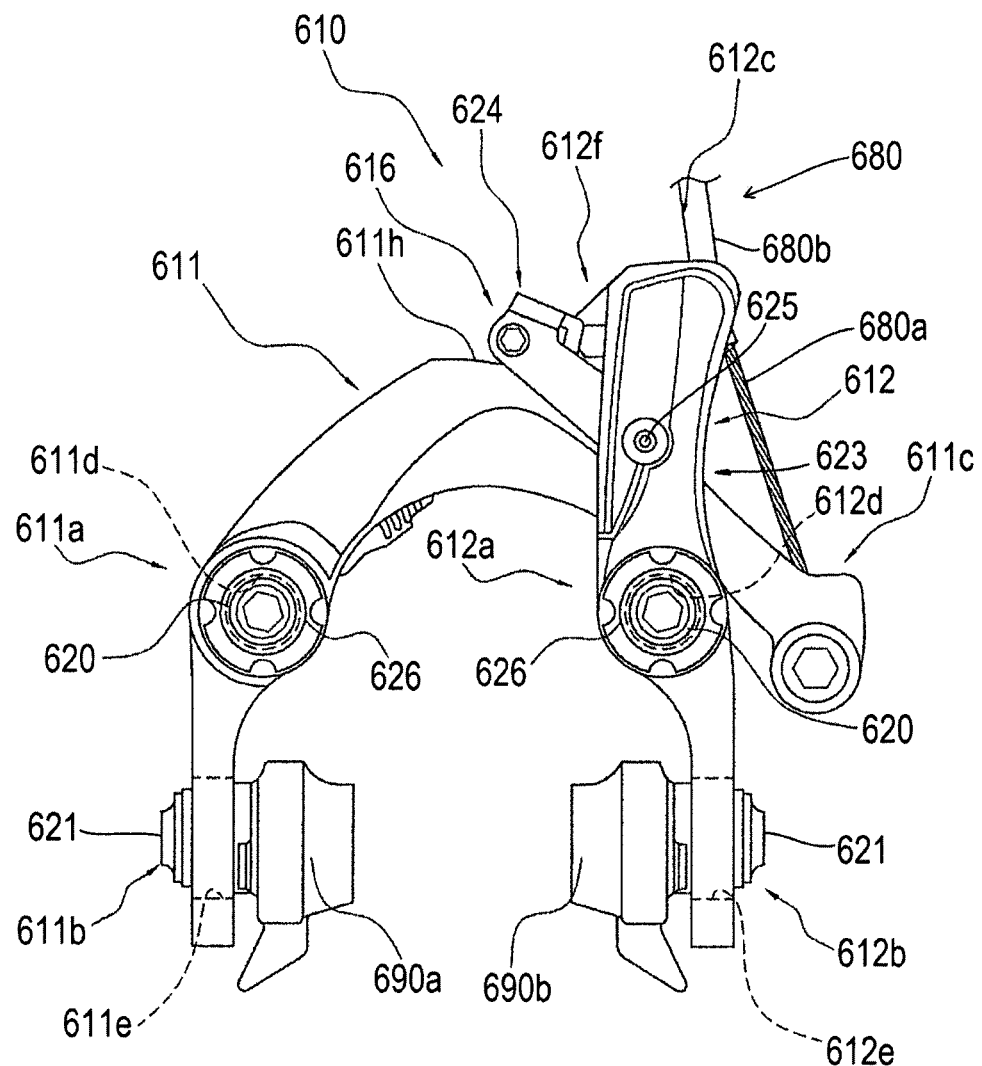
FIG. 17 is a front view of the side-pull bicycle brake device.
Figure 18:
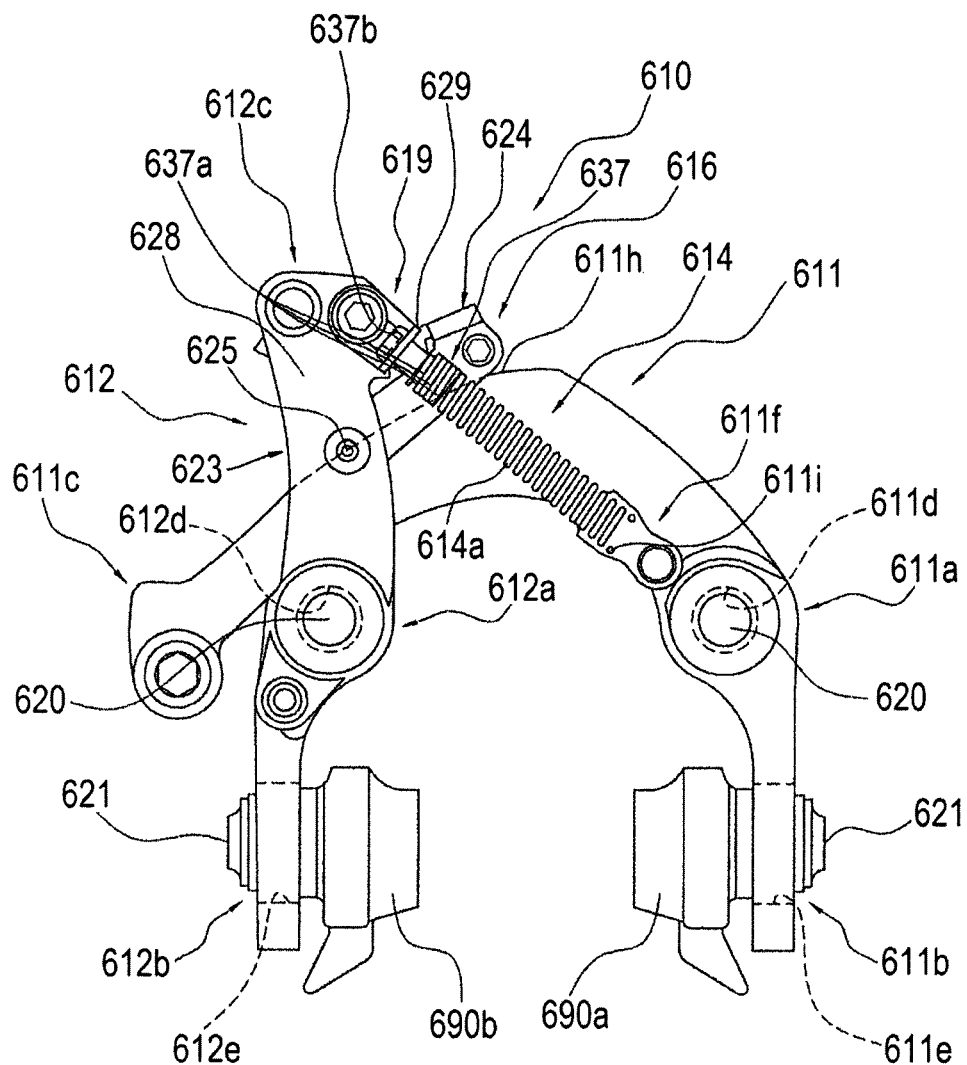
FIG. 18 is a rear view of the side-pull bicycle brake device.
Figure 19:
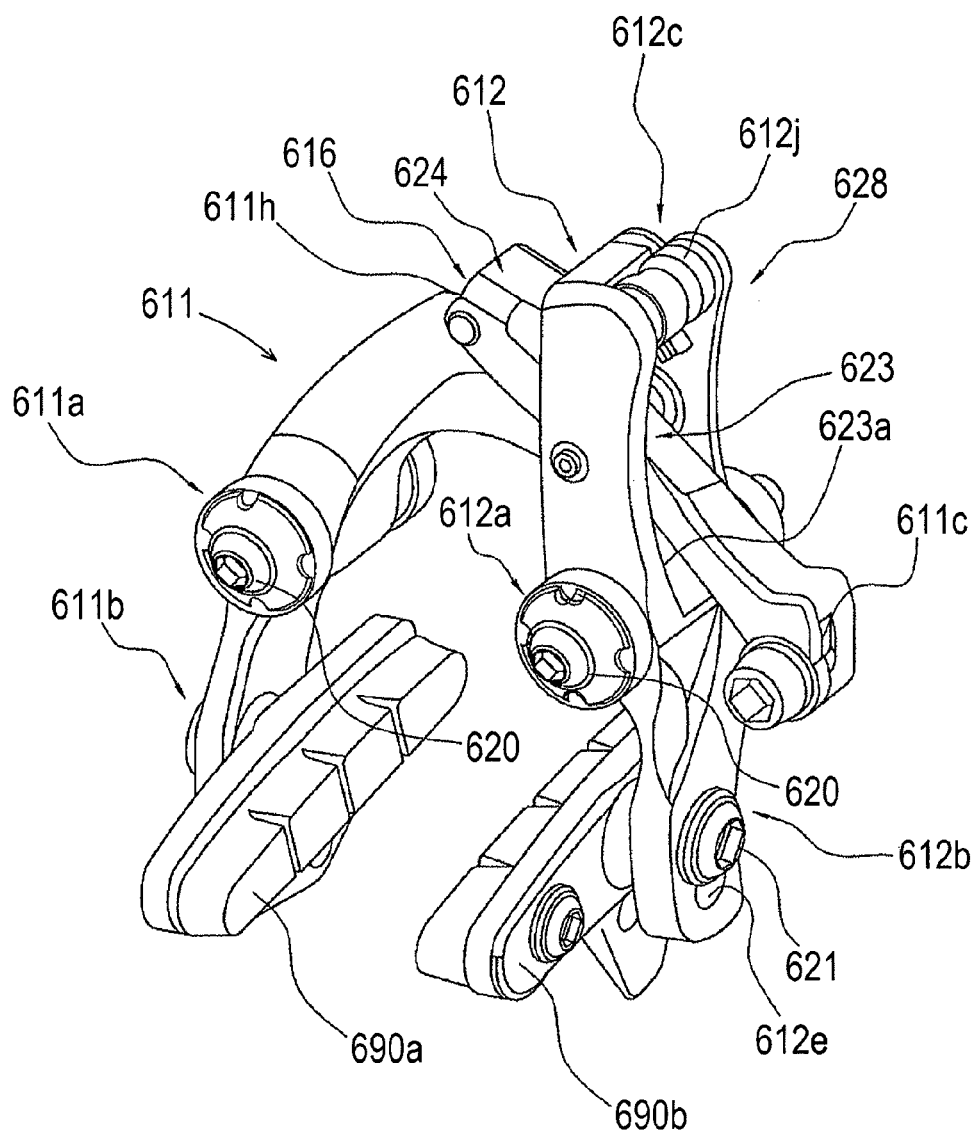
FIG. 19 is a front perspective view of the side-pull bicycle brake device.
Figure 20:
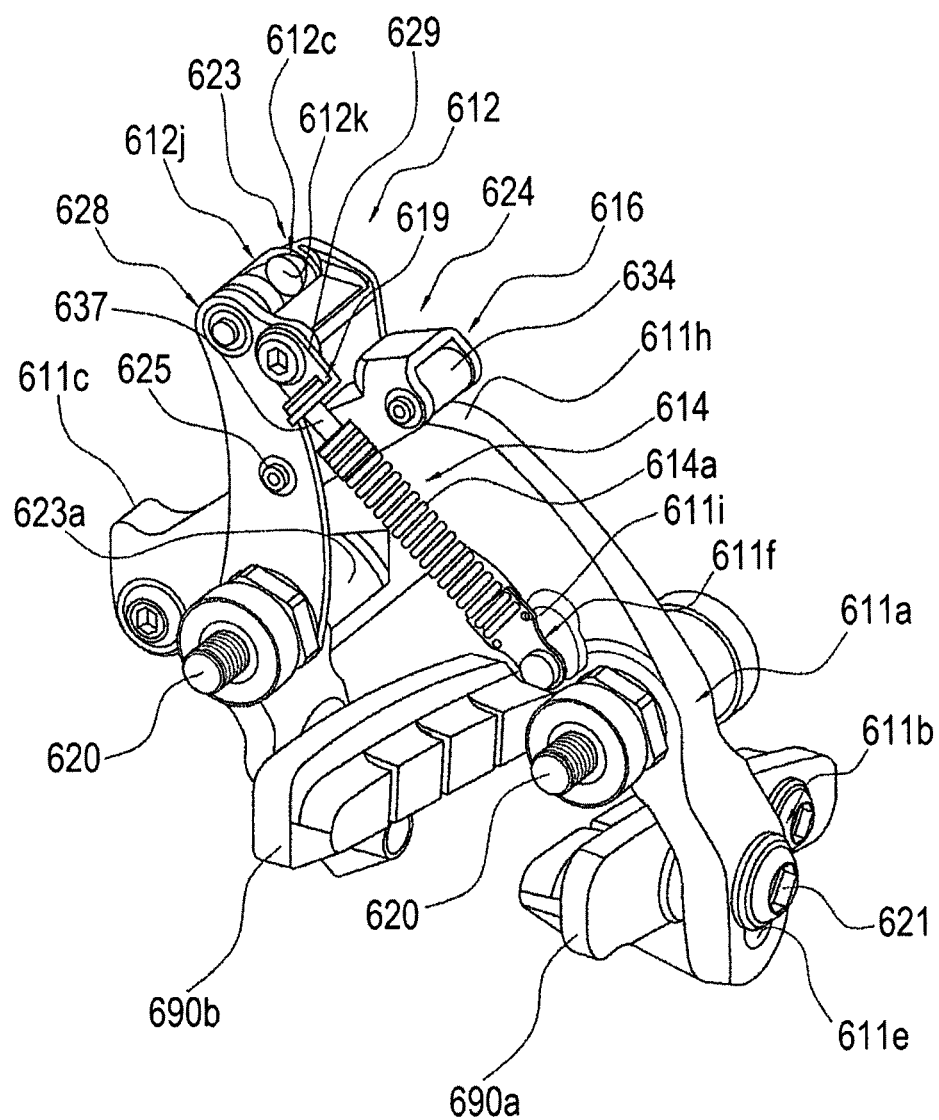
FIG. 20 is a rear perspective view of the side-pull bicycle brake device.

FIG. 16 is a side view of an alternative embodiment of a side-pull bicycle brake device 610 attached to a rear chainstay 602 of a bicycle, FIG. 17 is a front view of brake device 610, FIG. 18 is a rear view of brake device 610, FIG. 19 is a front perspective view of brake device 610, and FIG. 20 is a rear perspective view of brake device 610. Brake device 610 includes a first brake arm 611, a second brake arm 612, a biasing member 614 (FIG. 18) in the form of a coil spring 614a that biases first brake arm 611 and second brake arm 612 in a brake releasing direction, a synchronizing link 616 (FIG. 21), an adjustment mechanism 618 (FIG. 21), and a biasing force adjustment mechanism 619 (FIG. 18).

First brake arm 611 may be made of metal such as aluminum alloy, and in this embodiment first brake arm 611 is curved into an approximately C shape. First brake arm 611 includes a first brake arm mounting portion 611a pivotally mountable to one of the pair of chain stays 602, a first brake pad mounting portion 611b to which a first brake pad 690a is mounted, and a first control interface portion in the form of a first cable mounting portion 611c to which an inner cable 680a of a brake operating cable 680 is mounted. As shown in FIG. 18, a first spring hooking portion 611f for hooking one end of biasing member 614 is rotatably mounted on a rear surface of first brake arm 611. First spring hooking portion 611f has a plurality of locking holes 611i for locking biasing member 614. The plurality of locking holes 611*i* are formed according to the pitch of coil spring 614*a* when coil spring 614*a* has a free length.

First brake arm mounting portion 611*a* has a bushing hole 611*d* into which a bushing 626 that supports a mounting bolt 620 for mounting first brake arm mounting portion 611*a* to chain stay 602 is fitted. First brake pad mounting portion 611*b* extends linearly downward from first mounting portion 611*a*. First brake pad mounting portion 611*b* has a first brake pad mounting opening 611*e* through which a brake pad fixing bolt 621 for fixing first brake pad 690*a* extends.

First cable mounting portion 611*c* curves from first brake arm mounting portion 611*a* and extends to the right side in FIG. 17. First cable mounting portion 611*c* fixes inner cable 680*a* with a screw. Although a quick release mechanism is not provided at first cable mounting portion 611*c* in this embodiment, a quick release mechanism may be provided as in the above embodiment.

Second brake arm 612 may be made of a metal such as an aluminum alloy. Second brake arm 612 includes a second brake arm mounting portion 612*a* pivotally mountable to the other one of the pair of chain stays 602, a second brake pad mounting portion 612*b* to which a second brake pad 690*b* is mounted, a bifurcated second brake arm body 623 that forms a vertically elongated slot 623*a*, a link member 624 disposed within slot 623*a* and pivotably coupled to second brake arm body 623 through a pivot shaft 625, and a second control interface portion in the form of a second cable mounting portion 612*c* disposed on a support member 628 of second brake arm body 623.

Second brake arm mounting portion 612*a* has a bushing hole 612*d* into which a bushing 626 that supports a mounting bolt 620 for mounting second brake arm mounting portion 612*a* to chain stay 602 is fitted. Second brake pad mounting portion 612*b* is disposed so as to oppose first brake pad mounting portion 611*b* and extends substantially linearly downward from second brake arm mounting portion 612*a*. Second brake pad mounting portion 612*b* has a second brake pad mounting opening 612*e* through which a brake pad fixing bolt 621 for fixing second brake pad 690*b* extends. As shown in FIGS. 19 and 20, second cable mounting portion 612*c* comprises an axle member 612*j* rotatably supported by support member 628. A recessed opening 612*k* for locking outer casing 680*b* of brake operating cable 680 is formed in axle member 612*j*.

Figure 21:
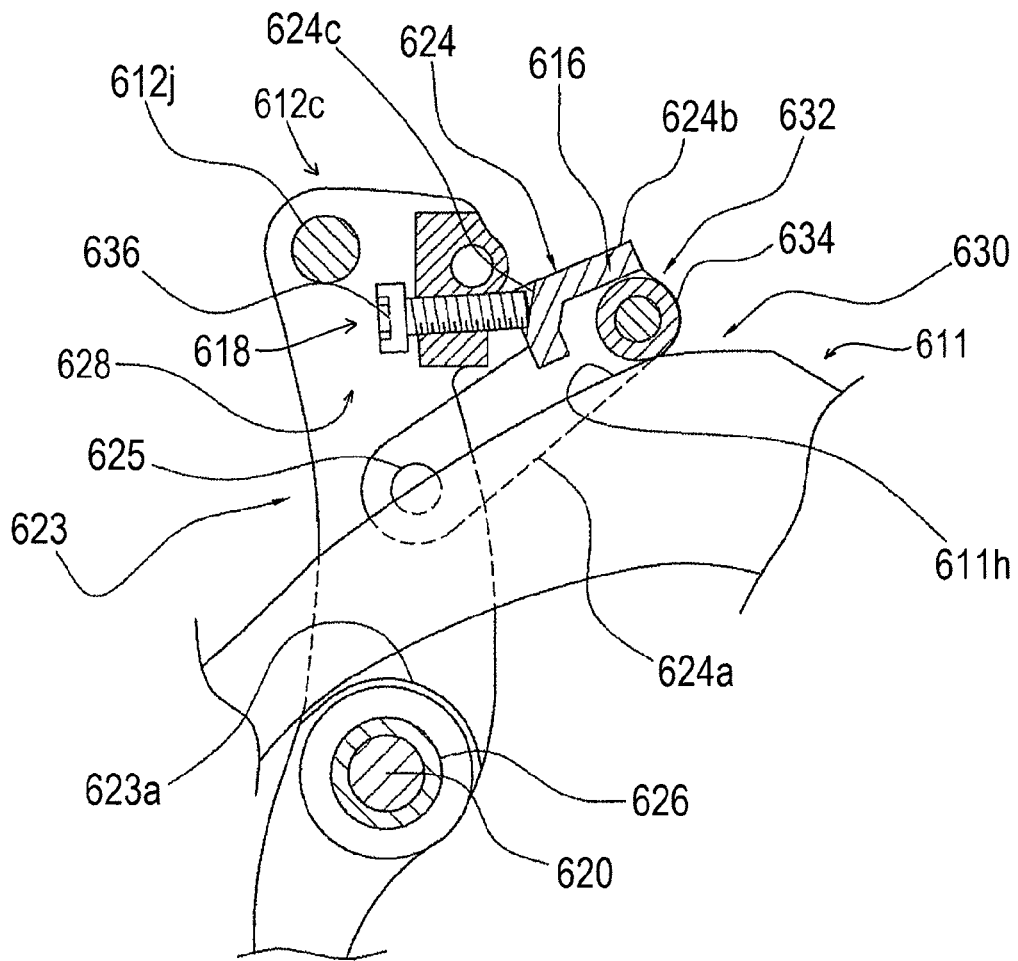
FIG. 21 is a detailed view of an embodiment of a synchronizing link.

Link member 624 functions as a bias communicating member that may be a plate-shaped member made of metal such as aluminum alloy. As shown in FIG. 21, link member 624 has a pivot coupling portion 624*a* and a roller bracket 624*b* that has a C shape in cross-section. Pivot coupling portion 624*a* is disposed within slot 623*a* and is supported by pivot shaft 625. Pivot coupling portion 624*a* functions as a bias communicating member mounting portion that pivots around a bias communicating member pivot axis defined by pivot shaft 625. Roller bracket 624*b* is formed integrally with pivot coupling portion 624*a*, and a roller 634 is rotatably supported by roller bracket 624*b*. Roller 634 functions as a first brake arm interface portion for interfacing with first brake arm 611 at a location offset from pivot coupling portion (bias communicating member mounting portion) 624*a*. The left side portion of roller bracket 624*b* is bent downwardly at 90 degrees, and a beveled surface 624*c* is formed in the upper left corner. Beveled surface 624*c* functions as a second brake arm interface portion for interfacing with second brake arm 612 at a location offset from pivot coupling portion (bias communicating member mounting portion) 624*a*

Synchronizing link 616 is provided for moving first brake arm 611 and second brake arm 612 in synchronization when brake device 610 is operated. As shown in FIG. 21, synchronizing link 616 comprises a first link portion 630 operatively coupled to first brake arm 611 and a second link portion 632 operatively coupled to second brake arm 612. In this embodiment, first link portion 630 comprises a contact surface 611*h* formed on a curved outer peripheral surface of first brake arm 611, and second link portion 632 comprises roller 634, wherein contact surface 611*h* contacts roller 634. Brake device 610 produces the same synchronizing effects discussed in the above embodiment.

Adjustment mechanism 618 is provided for adjusting the relative position between second brake arm body 623 and link member 624. Such adjustment allows the distance between first brake shoe 690*a* and second brake shoe 690*b* to be adjusted so that the distance from first brake shoe 690*a* to the wheel rim and the distance from second brake shoe 690*b* to the wheel rim are the same. As shown in FIG. 21, adjustment mechanism 618 includes an adjustment screw 636 that screws into second brake arm body 623 above slot 623*a*. Adjustment screw 636 is obliquely disposed so as to be contactable with beveled surface 624*c* of roller bracket 624*b*. Since second brake arm body 623 is biased in the brake releasing direction (clockwise in FIG. 21) by biasing member 614, adjustment screw 636 always contacts beveled surface 624*c* of roller bracket 624*b*, and roller 634 always contacts contact surface 611*h* of first brake arm 611. Thus, when adjustment screw 636 is loosened, first brake arm 611 and second brake arm 612 pivot in the brake releasing direction. Conversely, when adjustment screw 636 is tightened, first brake arm 611 and second brake arm 612 pivot in the braking direction.

Biasing force adjustment mechanism 619 is provided for adjusting the biasing force of biasing member 614. As shown in FIG. 18, biasing force adjustment mechanism 619 includes a biasing force adjustment member 637 supported by a rotation support member 629, wherein rotation support member 629 is rotatably disposed on a rear surface of second brake arm body 623. Biasing force adjustment member 637 includes a spiral spring holding groove 637*a*, and coil spring 614*a* is held by and coils along spring holding groove 637*a*. A tool engagement portion 637*b* structured to be engaged by a hexagonal wrench is formed on biasing force adjustment member 637. When the hexagonal wrench rotates biasing force adjustment member 637, coil spring 614*a* stretches so that a spring force of coil spring 614*a* can be adjusted. When the biasing force is increased, brake device 610 may be quickly switched to a brake released state, and when the biasing force is decreased, even a rider with a weak grip can easily perform the braking operation.

Although link member 624 was provided separately from first brake arm 611 and second brake arm body 623 in the above embodiment, link member 624 may be formed integrally with one of the brake arms. In that case, the spacing between first brake shoe 690*a* and second brake shoe 690*b* may be adjusted by another mechanism. While support member 628 was formed as an integral part of second brake arm body 623, support member 628 may be a plate-shaped member that is screwed to second brake arm body 623 with a plurality of screws. Although second cable mounting portion 612*c* to which outer casing 680*b* is mounted was provided at second brake arm 612, the second cable mounting portion may be provided on the bicycle itself. Although biasing force adjustment mechanism 619 was provided at second brake arm 612, the biasing force adjustment mechanism may be provided at first brake arm 611. Alternatively, the biasing force adjustment mechanism may be provided at both first brake arm 611 and second brake arm 612. While biasing force adjustment member 637 was structured to be rotated by a hexagonal wrench, biasing force adjustment member 637 may be configured to be manually rotated. If desired, biasing force adjustment mechanism 619 may be provided in brake device 510.

Figure 22:
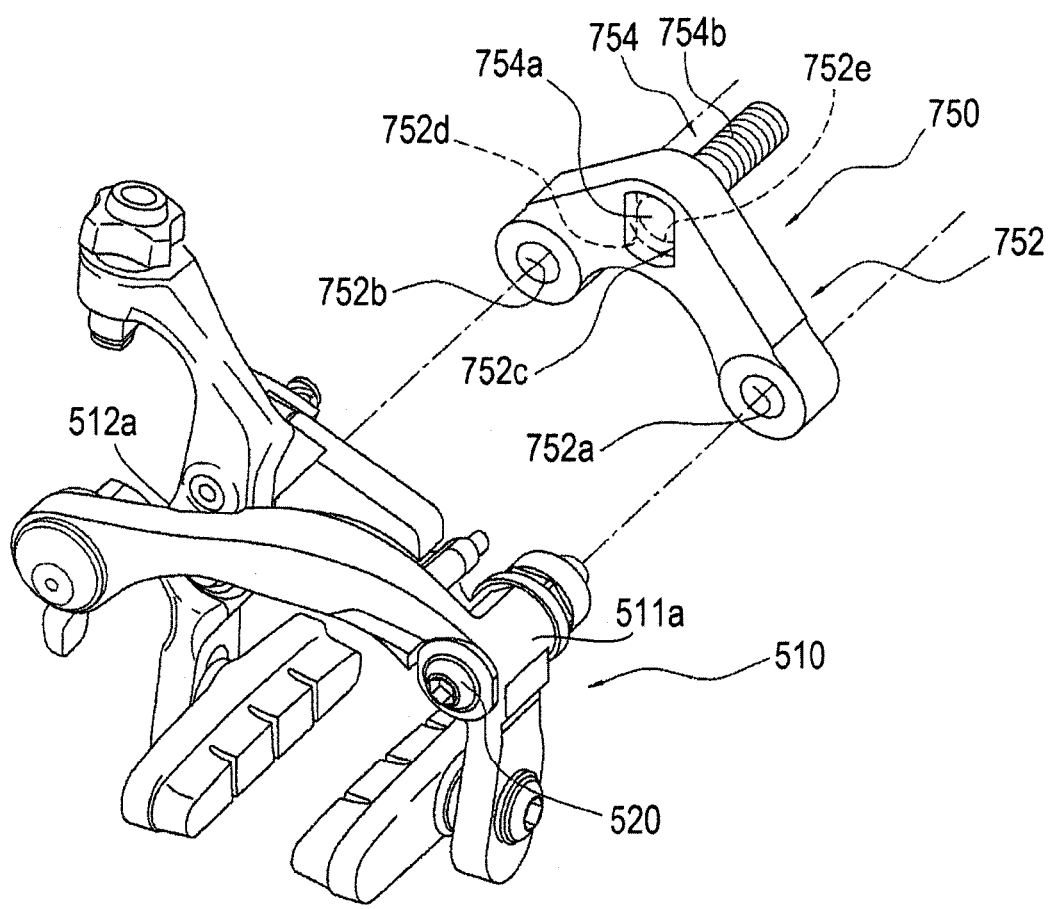
FIG. 22 is a perspective view of an embodiment of an adapter for a bicycle brake device.

In the embodiments shown in FIGS. 11-21, brake devices 510 and 610 are directly mounted to the bicycle frame (front fork 500 or chain stay 602). In another embodiment shown in FIG. 22, a brake device (e.g. brake device 510 shown, brake device 610, etc.) may include an adapter 750 that is mountable to an existing frame or to a new frame when there is only one mounting hole (such as the centrally-disposed mounting hole often used to mount some types of side-pull brakes). In this embodiment, adapter 750 includes an adapter body 752 and a fixing bolt 754 for fixing adapter body 752 to a frame member. Adapter body 752 may be formed into a curved chevron shape, for example. Adapter body 752 has a first fixing portion 752a and a second fixing portion 752b configured to be disposed to oppose first mounting portion 511a and second mounting portion 512a, respectively. First fixing portion 752a and second fixing portion 752b include holes having a size large enough for mounting bolts 520 to pass therethrough. Adapter body 752 has a third fixing portion 752c adapted to be mounted to the center portion of the frame member. A non-circular recessed portion 752d engaged with a head portion 754a of fixing bolt 754 is formed in third fixing portion 752c so that fixing bolt 754 is prevented from rotating. Also, a through hole 752e through which fixing bolt 754 can extend is formed in third fixing portion 752c. If desired, the adapter may include only the adapter body. In that case, a commercially-available bolt may be used as the fixing bolt.

The size, shape, location or orientation of the various components may be changed as desired. The terms "first" and "second" are relative terms such that a first brake arm in one embodiment may function as a second brake arm in another embodiment, and vice versa. While the synchronizing force was illustrated as a pushing force, a pulling force could be used in part or as a substitute to produce a synchronizing force. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle brake apparatus comprising:
   a first brake arm including:
      a first brake arm mounting portion for mounting the first brake arm to a bicycle frame member;
      a first brake pad mounting portion, wherein the first brake arm mounting portion is adapted to mount to the bicycle frame member for pivoting around a first pivot axis; and
      a first control interface portion;
   a second brake arm including:
      a second brake arm mounting portion for mounting the second brake arm to the bicycle frame member, wherein the second brake arm mounting portion is adapted to mount to the bicycle frame member for pivoting around a second pivot axis; and
      a second brake pad mounting portion;
   a biasing member operatively coupled to the first brake arm so that the first brake pad mounting portion is biased in a selected direction; and
   a synchronizing link that communicates a synchronizing force that arises from one of the first brake arm or the second brake arm to the other one of the first brake arm or the second brake arm so that the first brake arm and the second brake arm move in synchronization;
   wherein the synchronizing link comprises a bias communicating member operatively coupled between the first brake arm and the second brake arm to communicate biasing force from the biasing member to the second brake arm, wherein the bias communicating member comprises:
      a bias communicating member mounting portion;
      a first brake arm interface portion; and
      a second brake arm interface portion;
   wherein the first brake arm interface portion interfaces with the first brake arm at a location offset from the bias communicating member mounting portion; and
   wherein the second brake arm interface portion interfaces with the second brake arm at a location offset from the bias communicating member mounting portion.

2. The apparatus according to claim 1 wherein the biasing member comprises a coil spring.

3. The apparatus according to claim 1 wherein the biasing member comprises a piston.

4. The apparatus according to claim 1 wherein the second brake arm is unbiased except for the biasing force from the bias communicating member.

5. The apparatus according to claim 1 wherein the bias communicating member mounting portion is disposed between the first brake arm interface portion and the second brake arm interface portion.

6. The apparatus according to claim 5 wherein the bias communicating member is structured to be mounted for pivoting around a bias communicating member pivot axis, wherein the first brake arm interface portion has a first brake arm interface end, wherein the second brake arm interface portion has a second brake arm interface end, and wherein a distance from the bias communicating member pivot axis to the first brake arm interface end is greater than a distance from the bias communicating member pivot axis to the second brake arm interface end.

7. The apparatus according to claim 5 further comprising an adjustment mechanism that adjusts a relative position between the second brake arm and the second brake arm interface portion.

8. The apparatus according to claim 7 wherein the adjustment mechanism is disposed at the second brake arm.

9. The apparatus according to claim 8 wherein the second brake arm interface portion is disposed between the second brake arm mounting portion and the second brake pad mounting portion.

10. The apparatus according to claim 9 wherein the adjustment mechanism is disposed between the second brake arm mounting portion and the second brake pad mounting portion for engaging the second brake arm interface portion.

11. The apparatus according to claim 1 further comprising a biasing force adjustment mechanism that adjusts a biasing force of the biasing member.

12. The apparatus according to claim 11 wherein the biasing member comprises a coil spring, wherein the biasing force adjustment mechanism comprises a rotatable biasing force adjustment member that includes a spiral spring holding groove, wherein the coil spring extends along the spring holding groove.

13. The apparatus according to claim 12 wherein rotation of the biasing force adjustment member causes the coil spring to move relative to the biasing force adjustment member along the spring holding groove.

14. The apparatus according to claim 1 wherein the second brake arm further includes a second control interface portion, and wherein both the first control interface portion and the second control interface portion are disposed on a same side as one of the first brake pad mounting portion or the second brake pad mounting portion.

15. The apparatus according to claim 14 wherein the synchronizing link comprises:
a first link portion provided at the first brake arm, and
a second link portion provided at the second brake arm and contactable with the first link portion.

16. The apparatus according to claim 15 wherein one of the first link portion or the second link portion comprises a roller that contacts the other one of the first link portion or the second link portion.

17. The apparatus according to claim 14 wherein the second brake arm includes a second brake arm body, and wherein the synchronizing link comprises:
a link member coupled to the second brake arm body; and
an adjustment mechanism that adjusts a relative position between the link member and the second brake arm body.

18. The apparatus according to claim 14 further comprising an adapter including:
a first fixing portion to which the first brake arm mounting portion is fixable,
a second fixing portion to which the second brake arm mounting portion is fixable, and
a third fixing portion disposed between the first fixing portion and the second fixing portion and fixable to the bicycle frame member.

19. The apparatus according to claim 1 wherein the bias communicating member is structured to be mounted for pivoting around a bias communicating member pivot axis.

20. The apparatus according to claim 1 wherein the bias communicating member is movable relative to both the first brake arm and the second brake arm.

* * * * *